(12) United States Patent
Fukuma

(10) Patent No.: US 8,625,121 B2
(45) Date of Patent: Jan. 7, 2014

(54) IMAGE READING DEVICE AND IMAGE FORMING APPARATUS

(71) Applicant: KYOCERA Document Solutions Inc., Osaka (JP)

(72) Inventor: Nobuhiro Fukuma, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/655,226

(22) Filed: Oct. 18, 2012

(65) Prior Publication Data
US 2013/0100476 A1 Apr. 25, 2013

(30) Foreign Application Priority Data
Oct. 21, 2011 (JP) .................. 2011-232128

(51) Int. Cl.
G06F 3/12 (2006.01)
H04N 1/46 (2006.01)

(52) U.S. Cl.
USPC ............ 358/1.13; 358/1.1; 358/505; 358/509

(58) Field of Classification Search
None
See application file for complete search history.

(56) References Cited

FOREIGN PATENT DOCUMENTS

JP 2009-075184 A 4/2009

Primary Examiner — Thierry L Pham
(74) Attorney, Agent, or Firm — Arent Fox LLP

(57) ABSTRACT

The image reading device includes a light emitting portion, stick-like light guiding member, holding member and case member. An end portion the light guiding member is disposed to face the light emitting portion. The holding member holds the light emitting portion and the light guiding member. The holding member has first and second positioned portions. The first and second positioned portions are formed at one end part and another end part of the holding member in a main scanning direction, respectively. The holding member is attached to the case member. The case member has first and second positioning portions. The first and second positioning portions are formed integrally with the case member. The first and second positioning portions are configured to restrict the inserted first and second positioned portions from moving in a direction transverse to the main scanning direction, respectively.

11 Claims, 17 Drawing Sheets

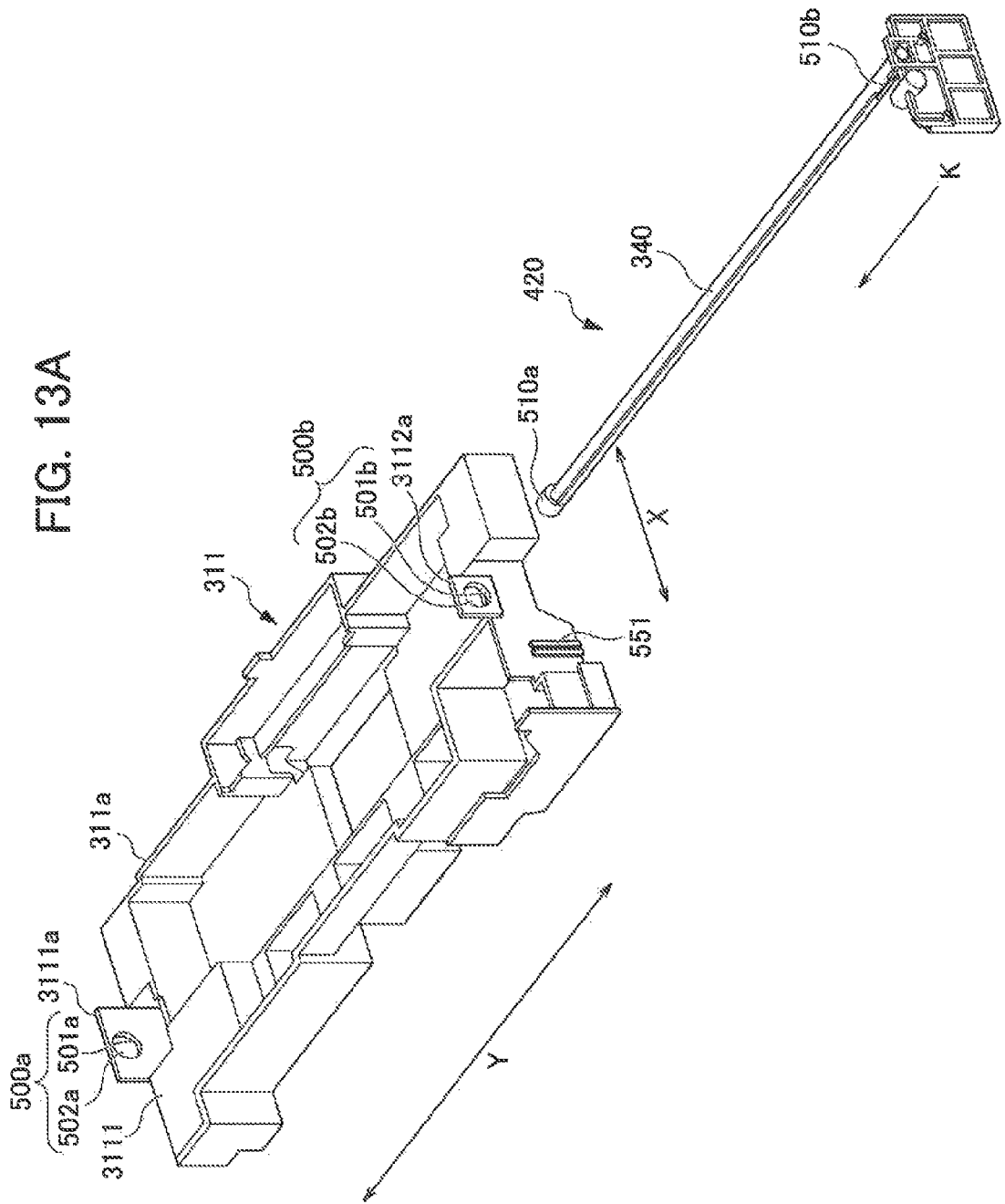

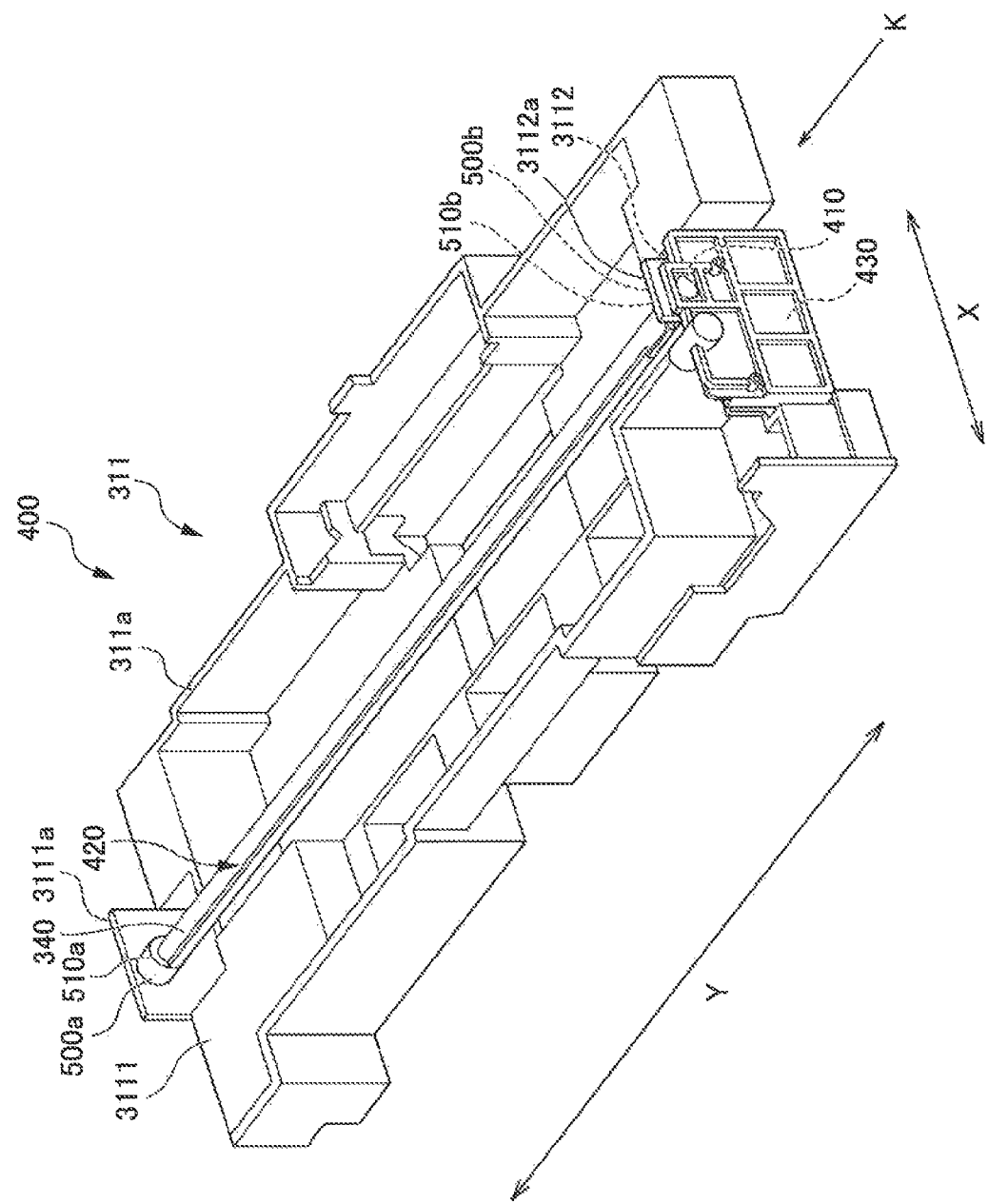

IMAGE READING DEVICE AND IMAGE FORMING APPARATUS

INCORPORATION BY REFERENCE

This application is based on and claims the benefit of priority from Japanese Patent. Application No. 2011-232128, filed on 21 Oct. 2011, the content of which is incorporated herein by reference.

BACKGROUND

The present disclosure relates to an image reading device and an image forming apparatus.

In recent years, an image reading device has been reported that employs an LED as a light source, paying attention to environmental issues. As such an image reading device that employs an LED, for example, an image reading device has been reported that is configured to dispose a plurality of LEDs in a main scanning direction at predetermined intervals.

However, the image reading device that requires a plurality of LEDs has been disadvantageous in terms of cost performance in some cases.

In contrast, another image reading device has been reported that is configured to dispose a high-intensity LED at one end of a long stick-like light guiding member in a main scanning direction, which is composed of an acrylic resin or polycarbonate to extend in the main scanning direction.

In such a case, only a single (or a small number of) LED(s) is required, which brings about an advantage in terms of cost performance.

However, in order to uniformly irradiate a document with light in the aforementioned type of image reading device having the light guiding member, it is necessary to implement highly accurate positioning by taking into consideration a positional relationship thereof with related members such as a reflecting member.

SUMMARY

The present disclosure provides an image reading device, in which a light guiding member is positioned with high accuracy with a simple configuration.

Moreover, the present disclosure provides an image forming apparatus that includes such an image reading device.

The image reading device includes a light emitting portion, a light guiding member, a holding member and a case member. The light guiding member is stick-like, and an end portion thereof is disposed to face the light emitting portion. The holding member holds the light emitting portion and the light guiding member. The holding member has a light reflecting portion, a first holding portion, a second holding portion, a first positioned portion, and a second positioned portion. The first holding portion is configured to hold the light emitting portion such that an optical axis is aligned with a main scanning direction. The second holding portion is configured to cause the light guiding member to be positioned with respect to the light reflecting portion, and to hold the light guiding member such that a central axis thereof is substantially coaxial with the optical axis. The first positioned portion is formed at one end part of the holding member in the main scanning direction, and the second positioned portion is formed at another end part of the holding member in the main scanning direction. The holding member is attached to the case member. The case member has a first positioning portion and a second positioning portion. The first positioning portion is formed integrally with the case member. The first positioned portion is inserted into the first positioning portion. The first positioning portion is configured to restrict the inserted first positioned portion from moving in a direction transverse to the main scanning direction. The second positioning portion is formed integrally with the case member. The second positioned portion is inserted into the second positioning portion. The second positioning portion is configured to restrict the inserted second positioned portion from moving in a direction transverse to the main scanning direction.

The present disclosure also relates to an image forming apparatus including the image reading device described above.

The image reading device of the present disclosure includes a light emitting portion, a light guiding member, a holding member and a case member. The light guiding member is stick-like, and an end portion thereof is disposed to face the light emitting portion. The holding member is configured to hold the light emitting portion and the light guiding member. The holding member has a first positioned portion and a second positioned portion. The first positioned portion is formed at one end part of the holding member in a main scanning direction, and the second positioned portion is formed at another end part of the holding member in the main scanning direction. The holding member is attached to the case member. The case member has a first positioning portion and a second positioning portion. The first positioning portion is formed integrally with the case member. The first positioned portion is inserted into the first positioning portion. The first positioning portion is configured to restrict the inserted first positioned portion from moving in a direction transverse to the main scanning direction. The second positioning portion is formed integrally with the case member. The second positioned portion is inserted into the second positioning portion. The second positioning portion is configured to restrict the inserted second positioned portion from moving in a direction transverse to the main scanning direction.

BRIEF DESCRIPTION OF THE DRAWINGS

FIG. 13A is a diagram illustrating steps for attaching the holding member 420 to the first frame 31.1;

FIG. 13C is a diagram illustrating steps for attaching the holding member 420 to the first frame 311.

DETAILED DESCRIPTION

Descriptions are hereinafter provided for an embodiment of an image forming apparatus according to the present disclosure with reference to the drawings.

An overall configuration of a copy machine 1 as the image forming apparatus of the present embodiment will be described with reference to FIG. 1.

Figure 1:
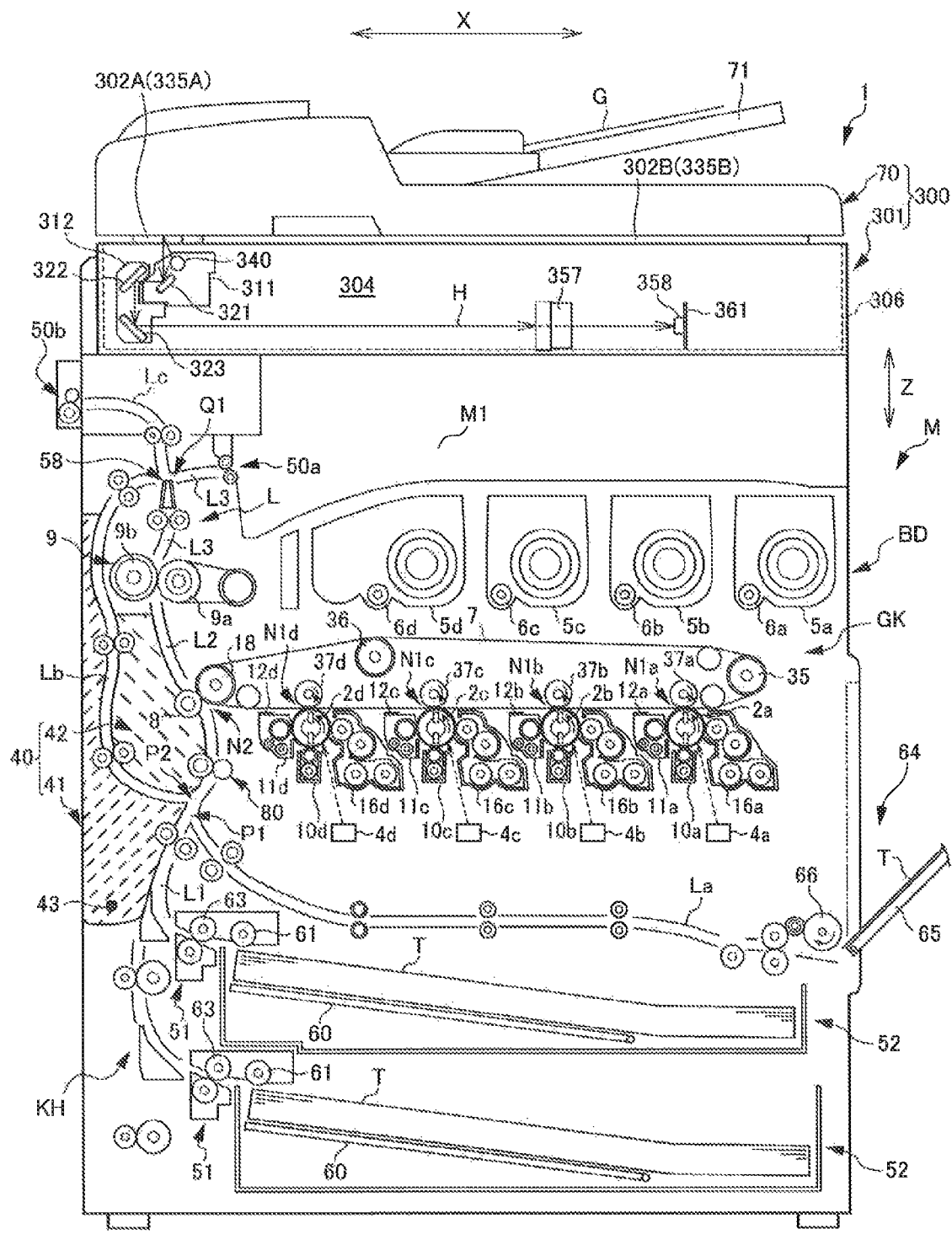
FIG. 1 is a diagram illustrating an arrangement of components of a copy machine as an image forming apparatus.

As shown in FIG. 1, the copy machine 1 as the image forming apparatus includes an image reading device 300 disposed at an upper side in a vertical direction Z and an apparatus main body M. The apparatus main body M, which is disposed at a lower side in the vertical direction Z, forms a toner image on a sheet of paper T as a sheet-like medium to be printed, based on image information that is read by the image reading device 300.

It should be noted that, in the following descriptions of the copy machine 1, a sub-scanning direction X is also referred to as a "lateral direction" of the copy machine 1, and a main scanning direction Y (a direction penetrating FIG. 1, see FIG. 2) is also referred to as a "depth direction" of the copy machine 1. The vertical direction Z is orthogonal to the sub-scanning direction X and the main scanning direction Y.

Firstly, descriptions are provided for the image reading device 300.

As shown in FIG. 1, the image reading device 300 includes a reader unit 301 that reads an image of a document G, and a document feed unit 70 that is disposed above the reader unit 301 and feeds the document G to the reader unit 301.

The reader unit 301 includes a chassis 306, and a first reader surface 302A and a second reader surface 302B that are disposed above the chassis 306. Moreover, the reader unit 301 includes a light guiding member 340, a plurality of mirrors 321, 322 and 323, a first frame 311 and a second frame 312, an imaging lens 357, a CCD 358 that serves as reading means and a CCD substrate 361, in an internal space 304 of the chassis 306. The light guiding member 340 irradiates the document G mounted on the first reader surface 302A or the second reader surface 302B with light received from a light emitting portion that serves as a light source. The first frame 311 and second frame 312 are housings moving in the sub-scanning direction X. The CCD substrate 361 performs predetermined processing on image information that is read by the CCD 358 and outputs the image information to the apparatus main body M. The light guiding member 340 and the mirror 321 are housed in the first frame 311. The second mirror 322 and the third mirror 323 are housed in the second frame 312.

The light guiding member 340 and the light emitting portion are assembled into the first frame 311 of a housing, and are unitized as a light emitting unit 400 (see FIG. 2) to be attached to the chassis 306.

The light emitting unit 400 will be described later in detail.

The document feed unit 70 is connected with the reader unit 301 by a connecting portion (not illustrated) so as to be openable and closable. The document feed unit 70 includes a document mounting portion 71 on an upper side thereof and feed rollers (not illustrated) inside. The document feed unit 70 has a function of protecting the first reader surface 302A and the second reader surface 302B of the reader unit 301.

The first reader surface 302A is used when a document G is read, which is fed by the document feed unit 70. The first reader surface 302A is formed on an upper surface of a first contact glass 335A to which the document G is fed. The first reader surface 302A is positioned in the vicinity of a left lateral face of the chassis 306. It should be noted that such a position shown in FIG. 1 is also referred to as a "first reading position."

The second reader surface 302B is used when a document G is read without using the document feed unit 70. The second reader surface 302B is formed on an upper surface of a second contact glass 335B on which the document G is mounted. The second reader surface 302B is positioned more to the right than the first reader surface 302A, and occupies most of the reader unit 301 in the sub-scanning direction X.

The first reader surface 302A and the second reader surface 302B each extend in both the sub-scanning direction X and the main scanning direction Y.

A document G mounted on the document mounting portion 71 is fed by the document feed unit 70. The document G mounted on the document mounting portion 71 is fed to the first reader surface 302A of the reader unit 301 by the feed rollers provided inside the document feed unit 70. In this case, the first frame 311 and the second frame 312 do not move but remain in the first reading position. In addition, the document feed unit 70 slidingly feeds the document G on the first reader surface 302A, and the CCD 358 reads an image on a surface of the document G.

On the other hand, the document feed unit 70 is opened, and a document G is mounted on the second reader surface 302B. In this case, the first frame 311 and the second frame 312 each move in the sub-scanning direction X, while they are maintaining a length of a light path H (to be described later) constant. As a result, an image of the document G that is mounted on the second reader surface 302B is read.

In the internal space 304 of the chassis 306, the plurality of mirrors 321, 322 and 323 form the light path H through which the light from the document G travels into the imaging lens 357. Since the first frame 311 moves in the sub-scanning direction X at a predetermined speed A and the second frame 312 moves in the sub-scanning direction X at a predetermined speed A/2, the length of the light path H is maintained constant even while image reading is being performed.

Next, descriptions are provided for the apparatus main body M.

The apparatus main body M includes an image forming unit GK and a paper feeding/discharging portion KH. The image forming unit GK forms a predetermined toner image on a sheet of paper T based on predetermined image information. The paper feeding/discharging portion KH feeds the sheet of paper T to the image forming unit GK, and discharges the sheet of paper T on which a toner image has been formed.

An external shape of the apparatus main body M is composed of a case body BD as a housing.

As shown in FIG. 1, the image forming unit GK includes photoreceptor drums 2a, 2b, 2c and 2d as image supporting bodies (photoreceptors), charging portions 10a, 10b, 10c and 10d, laser scanner units 4a, 4b, 4c and 4d as exposure units, developing units 16a, 16b, 16c and 16d, toner cartridges 5a, 5b, 5c and 5d, toner feeding portions 6a, 6b, 6c and 6d, drum cleaning portions 11a, 11b, 11c and 11d, static eliminators 12a, 12b, 12c and 12d, an intermediate transfer belt 7, primary transfer rollers 37a, 37b, 37c and 37d, a secondary transfer roller 8, an opposing roller 183, and a fusing unit 9.

As shown in FIG. 1, the paper feeding/discharging portion KH includes a paper feeding cassette 52, a manual feeding portion 64, a paper path L for a sheet of paper T, a pair of resist rollers 80, a first discharging portion 50a, and a second discharging portion 50b. It should be noted that the paper path L is an assembly of a first paper path L1, a second paper path L2, a third paper path L3, a manual paper path La, a reverse paper path Lb, and a post-processing paper path Lc.

Components of the image forming unit GK and the paper feeding/discharging portion KH are described hereinafter in detail.

In the image forming unit GK, charging by the charging portions 10a, 10b, 10c and 10d, exposure by the laser scanner units 4a, 4b, 4c and 4d, development by the developing units 16a, 16b, 16c and 16d, primary transfer by the intermediate transfer belt 7 and the primary transfer rollers 37a, 37b, 37c and 37d, static elimination by the static eliminators 12a, 12b, 12c and 12d, and cleaning by the drum cleaning portions 11a, 11b, 11c and lid are performed on a surface of each of the photoreceptor drums 2a, 2b, 2c and 2d from an upstream side to a downstream side in sequence.

In addition, in the image forming unit GK, secondary transfer is performed by the intermediate transfer belt 7, the secondary transfer roller 8 and the opposing roller 18, and fixation is performed by the fusing unit 9.

Each of the photoreceptor drums 2a, 2b, 2c and 2d is composed of a cylindrically shaped member.

The charging portions 10a, 10b, 10c and 10d uniformly negatively charge (negative polarity) or positively charge (positive polarity) the surfaces of the photoreceptor drums 2a, 2b, 2c and 2d, respectively.

The laser scanner units 4a, 4b, 4c and 4d are disposed to be spaced apart from the surfaces of the photoreceptor drums 2a, 2b, 2c and 2d, respectively. Each of the laser scanner units 4a, 4b, 4c and 4d is configured to include a laser light source, a polygonal mirror, a polygonal mirror driving motor and the like, which are not illustrated.

The laser scanner units 4a, 4b, 4c and 4d scan and expose the surfaces of the photoreceptor drums 2a, 2b, 2c and 2d, respectively, based on the image information related to the image that is read by the reader unit 301. An electrical charge is eliminated from exposed portions of each surface of the photoreceptor drums 2a, 2b, 2c and 2d. In this way, an electrostatic latent image is formed on the surface of each of the photoreceptor drums 2a, 2b, 2c and 2d.

The developing units 16a, 16b, 16c and 16d cause color toners to be attached to the photoreceptor drums 2a, 2c and 2d, and form color toner images on the surfaces of the photoreceptor drums 2a, 2b, 2c and 2d, respectively. The developing units correspond to four colors of yellow, cyan, magenta and black, respectively.

The toner cartridges 5a, 5b, 5c and 5d store toners of yellow, cyan, magenta and black, respectively.

The toner feeding portions 6a, 6b, 6c and 6d are provided correspondingly to the toner cartridges 5a, 5b, 5c and 5d and the developing units 16a, 16b, 16c and 16d, respectively. In addition, the toner feeding portions 6a, 6b, 6c and 6d supply the color toners stored in the toner cartridges 5a, 5b, 5c and 5d to the developing units 16a, 16b, 16c and 16d, respectively.

The intermediate transfer belt 7 is stretched around a driven roller 35, the opposing roller 18 composed of a driving roller, a tension roller 36, and the like. Since the tension roller 36 biases the intermediate transfer belt 7 from inside to outside, a predetermined tension is applied to the intermediate transfer belt 7.

The primary transfer rollers 37a, 37b, 37c and 37d are disposed on the opposite sides of the photoreceptor drums 2a, 2b, 2c and 2d, respectively, so as to sandwich the intermediate transfer belt 7.

Predetermined parts of the intermediate transfer belt 7 are nipped between the primary transfer rollers 37a, 37b, 37c and 37d and the photoreceptor drums 2a, 2b, 2c and 2d, respectively. The predetermined nipped parts are pressed against the surfaces of the photoreceptor drums 2a, 2b, 2c and 2d, respectively. Primary transfer nips N1a, N1b, N1c and N1d are formed between the photoreceptor drums 2a, 2b, 2c and 2d and the primary transfer rollers 37a, 37b, 37c and 37d, respectively. At the primary transfer nips N1a, N1b, N1c and N1d, respectively, toner images of the respective colors developed on the photoreceptor drums 2a, 2b, 2c and 2d are sequentially primarily transferred onto the intermediate transfer belt 7. In this manner, a full-color toner image is formed on the intermediate transfer belt 7.

Primary transfer bias application portions (not illustrated) apply a primary transfer bias to the primary transfer rollers 37a, 37b, 37c and 37d6, for the purpose of transferring the toner images of the colors formed on the photoreceptor drums 2a, 2h, 2c and 2d onto the intermediate transfer belt 7.

The static eliminators 12a, 12b, 12c and 12d remove electricity (eliminate an electrical charge) from the surfaces of the photoreceptor drums 2a, 2b, 2c and 2d, on which the primary transfer has been performed, by irradiating the surfaces of the photoreceptor drums 2a, 2b, 2c and 2d, respectively, with light.

The drum cleaning portions 11a, 11b, 11c and 11d remove toner and attached matter remaining on the surfaces of the photoreceptor drums 2a, 2b, 2c and 2d, respectively, and feed the removed toner to a predetermined collection mechanism for collection.

The secondary transfer roller 8 secondarily transfers the full-color toner image, which has been primarily transferred to the intermediate transfer belt 7, to the sheet of paper T. Secondary transfer bias application portions (not illustrated) apply a secondary bias to the secondary transfer roller 8 for the purpose of transferring the full-color toner image formed on the intermediate transfer belt 7 to the sheet of paper T.

The secondary transfer roller 8 is configured to be movable between an abutting position of abutting the intermediate transfer belt 7, and a separated position of being separated from the intermediate transfer belt 7. More specifically, the secondary transfer roller 8 is disposed in the abutting position when secondarily transferring the toner image, which has been primarily transferred to the surface of the intermediate transfer belt 7, to the sheet of paper T, and is otherwise disposed in the separated position.

A predetermined part of the intermediate transfer belt 7 is sandwiched between the secondary transfer roller 8 and the opposing roller 18. The sheet of paper T is pressed against an outer surface of the intermediate transfer belt 7 (the surface onto which the toner image has been primarily transferred). A secondary transfer nip N2 is formed between the intermediate transfer belt 7 and the secondary transfer roller 8. At the secondary transfer nip N2, the full-color toner image, which has been primarily transferred to the intermediate transfer belt 7, is secondarily transferred to the sheet of paper T.

The fusing unit 9 includes a heating rotator 9a that is heated by a heater, and a pressing rotator 9b that is brought into pressure contact with the heating rotator 9a. The heating rotator 9a and the pressing rotator 9b nip and apply pressure, and feed the sheet of paper T, to which the toner image has been secondarily transferred. Since the sheet of paper T is fed while being nipped between the heating rotator 9a and the pressing rotator 9b, the toner transferred to the sheet of paper is fused and pressed to be fixed on the sheet of paper T.

As shown in FIG. 1, two paper feeding cassettes 52 that store sheets of paper T are disposed in a vertical arrangement at a lower portion of the apparatus main body M. The paper feeding cassettes 52 are configured to be withdrawable from the housing of the apparatus main body M in a horizontal direction. The paper feeding cassette 52 stores the sheets of paper T as being stacked on a paper tray 60. A sheet of paper T placed on the paper tray 60 is fed to the paper path L by a cassette feeding portion 51 that is disposed at an end on a paper feeding side (a left end of FIG. 1) of the paper feeding cassettes 52. The cassette feeding portion 51 includes a double feed preventing mechanism that is composed of a forward feed roller 61 for picking up a sheet of paper T from the paper tray 60 and a pair of feed rollers 63 for feeding the sheet of paper T one at a time to the paper path L.

The manual feeding portion 64 is provided on a right lateral face (the right side in FIG. 1) of the apparatus main body M. The manual feeding portion 64 is primarily provided for the purpose of feeding a sheet of paper T, which is different in size and type from the sheets of paper T stored in the paper feeding cassette 52, to the apparatus main body M. The manual feeding portion 64 includes a manual feeding tray 65 and a paper feeding roller 66, in which the manual feeding tray 65 in its closed state composes a part of the right lateral face of the apparatus main body M. A lower end of the manual feeding tray 65 is rotationally connected (so as to be openable and closable) to the apparatus main body M in the vicinity of the paper feeding roller 66. The paper feeding roller 66 feeds a sheet of paper T, which is placed on the manual feeding tray 65 in the opened state, to the manual paper path La.

The first discharging portion 50a and the second discharging portion 50b are provided at an upper portion in the apparatus main body M. The first discharging portion 50a and the second discharging portion 50b discharge a sheet of paper T outside the apparatus main body M. The first discharging portion 50a and the second discharging portion 50b will be described later in detail.

The paper feed path L includes the first paper path L1 from the cassette feeding portion 51 to the secondary transfer nip N2, the second paper path L2 from the secondary transfer nip N2 to the fusing unit 9, the third paper path L3 from the fusing unit 9 to the first discharging portion 50a, the manual paper path La that guides a sheet of paper T fed from the manual feeding portion 64 to the first paper path L1, the reverse paper path Lb that reverses and returns the sheet of paper T, which is fed from upstream to downstream in the third paper path L3, to the first paper path L1, and a post-processing paper path Lc that feeds the sheet of paper T, which is fed from upstream to downstream in the third paper path L3, to a post-processing device (not illustrated) that is connected to the second discharging portion 50b.

In addition, a first junction P1 and a second junction P2 are provided midway in the first paper path L1. A first branch portion Q1 is provided midway in the third paper path L3.

The first junction P1 is a junction where the manual paper path La joins the first paper path L1. The second junction P2 is a junction where the reverse paper path Lb joins the first paper path L1.

The first branch portion Q1 is a branch portion where the post-processing paper path Lc branches off the third paper path L3. A switching member 58 is provided at the first branch portion Q1. The switching member 58 causes a feeding direction of a sheet of paper T discharged from the fusing unit 9 to be switched between the third paper path L3 leading to the first discharging portion 50a and the post-processing paper path Lc leading to the second discharging portion 50b.

More specifically, a sensor for detecting a sheet of paper T and the pair of resist rollers 80 are disposed between the second junction P2 and the secondary transfer roller 8, in which the purpose of the pair of resist rollers 80 is skew correction of the sheet of paper T, and timing adjustment between forming of an toner image in the image forming unit GK and feeding of the sheet of paper T. The sensor is disposed immediately anterior to the pair of resist rollers 80 in the feeding direction of a sheet of paper T (upstream in the feeding direction). The pair of resist rollers 80 is a pair of rollers that feeds a sheet of paper T by performing the correction or the timing adjustment based on a detected signal from the sensor.

The reverse paper path Lb reverses a sheet of paper T, which has been fed from the first branch portion Q1 toward the discharging portion 50, returns the sheet of paper T to the first paper path L1, and feeds the sheet of paper T upstream of the pair of resist rollers 80 disposed upstream of the secondary transfer roller 8. At the secondary transfer nip N2, a predetermined toner image is transferred to an unprinted surface of the sheet of paper T that has been reversed by the reverse paper path Lb.

The first discharging portion 50a is formed at an end of the third paper path L3. The first discharging portion 50a is disposed at an upper portion of the apparatus main body M. The first discharging portion 50a opens upon the right side of the apparatus main body M (on the right or a side of the manual feeding portion 64 in FIG. 1). The first discharging portion 50a discharges a sheet of paper T, which is fed through the third paper path L3, outside the apparatus main body M.

A discharged paper accumulating portion M1 is formed at an opening side of the first discharging portion 50a. A bottom face of the discharged paper accumulating portion M1 composes a part of an upper face of the apparatus main body M. After predetermined toner images are formed on sheets of paper T, the sheets of paper T are discharged from the first discharging portion 50a, and are stacked and accumulated at the discharged paper accumulating portion M1.

The second discharging portion 50b is formed at an end of the post-processing paper path Lc. The second discharging portion 50b opens upon a left side of the apparatus main body M (on the left or a side where a post-processing device is connected in FIG. 1). The second discharging portion 50b discharges a sheet of paper T, which is fed through the post-processing paper path Lc, outside the apparatus main body M.

A post-processing device (not illustrated) is connected at an opening side of the second discharging portion 50b. The post-processing device performs post-processing (stapling, punching, etc.) on a sheet of paper T discharged from the image forming apparatus.

It should be noted that a sensor for detecting a sheet of paper T is disposed at a predetermined position in each paper path.

As shown in FIG. 1, the main paper paths L1 to L3 and the reverse paper path Lb are arranged to extend primarily in the vertical direction on the left side of the apparatus main body M (the left side in FIG. 1). A cover 40 is provided at the left side of the apparatus main body M (the left side in FIG. 1) such that the cover 40 forms a part of a lateral face of the apparatus main body M. The cover 40 is coupled at a lower end thereof to the apparatus main body M via a fulcrum shaft 43. The fulcrum shaft 43 is disposed in a direction that intersects the main paper paths L1 to L3 and the reverse paper path Lb. The cover 40 is configured to be rotatable between a closed position (position shown in FIG. 1) and an opened position (not illustrated) about the fulcrum shaft 43.

The cover 40 is composed of a first cover portion 41 rotationally connected to the apparatus main body M via the fulcrum shaft 43, and a second cover portion 42 rotationally connected to the apparatus main body M via the same fulcrum shaft 43. The first cover portion 41 is positioned more outside the apparatus main body M than the second cover portion 42. It should be noted that, in FIG. 1, the portion hatched by falling diagonal broken lines from top right to bottom left is the first cover portion 41, and the portion hatched by falling diagonal broken lines from top left to bottom right is the second cover portion 42.

When a paper jam occurs in the main paper paths L1 to L3, it is possible to cause the cover 40 to rotate from the closed position shown in FIG. 1 to the opened position (not illustrated) so as to open the main paper paths L1 to L3, and to remove a jammed sheet of paper in the main paper paths L1 to L3. On the other hand, when a paper jam occurs in the reverse paper path Lb, it is possible to open the reverse paper path Lb by rotating the cover 40 to the opened position subsequently to cause the second cover portion 42 to rotate about the fulcrum shaft 43 toward the apparatus main body M side (the right side in FIG. 1) to release the reverse paper path Lb, and to remove a jammed sheet of paper in the reverse paper path Lb.

Next, with reference to FIGS. 2 to 13B, descriptions are provided for the lighting unit 400 and the image reading device 300.

The light emitting unit 400 includes an LED 410 as a emitting portion, the light guiding member 340, the holding member 420, and the first frame 311 (a case member) for housing the holding member 420. Moreover, the lighting unit 400 has an adjustment mechanism 600 configured to cause the holding member 420 to rotationally move.

Figure 2:
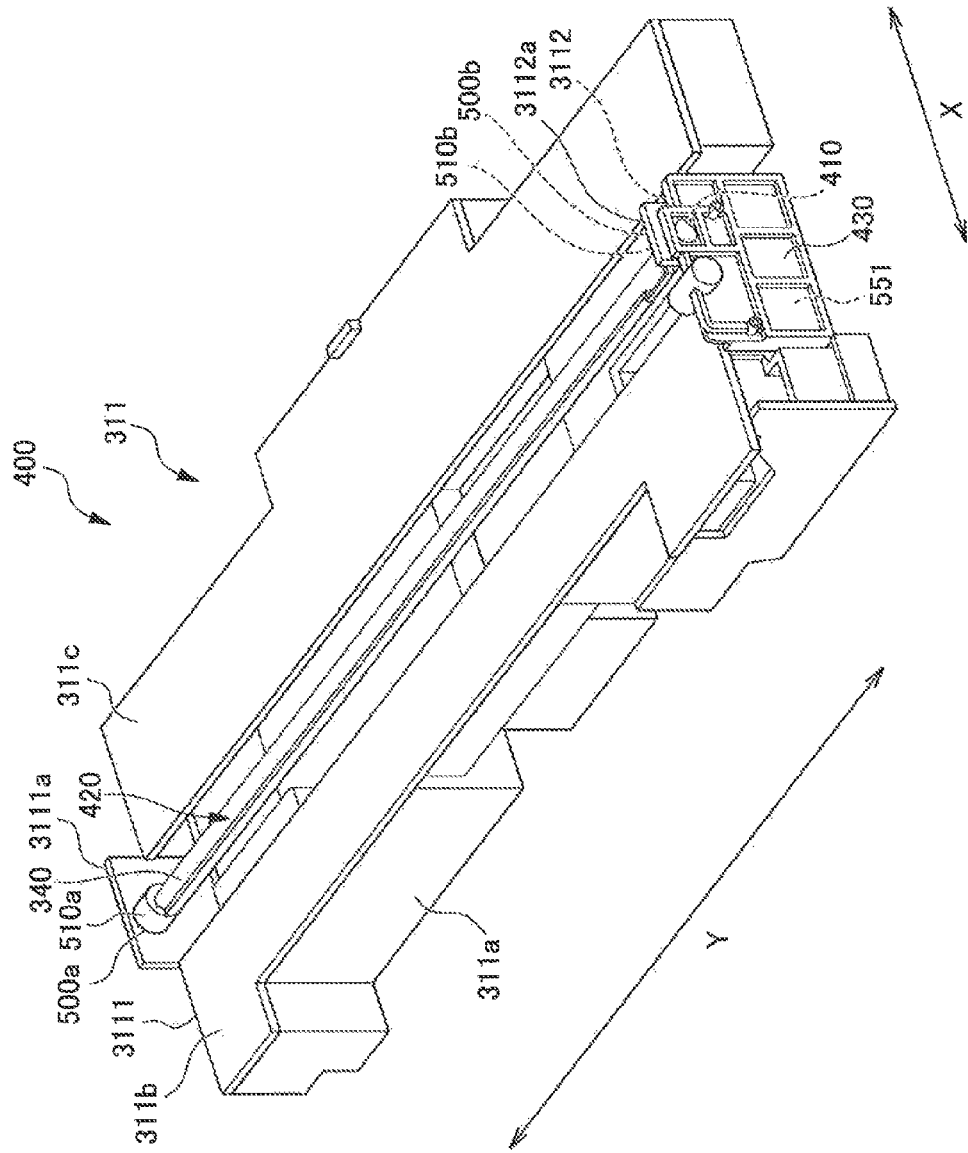
FIG. 2 is a perspective view of a light emitting unit 400 that is incorporated into an image reading device 300.
Figure 3:
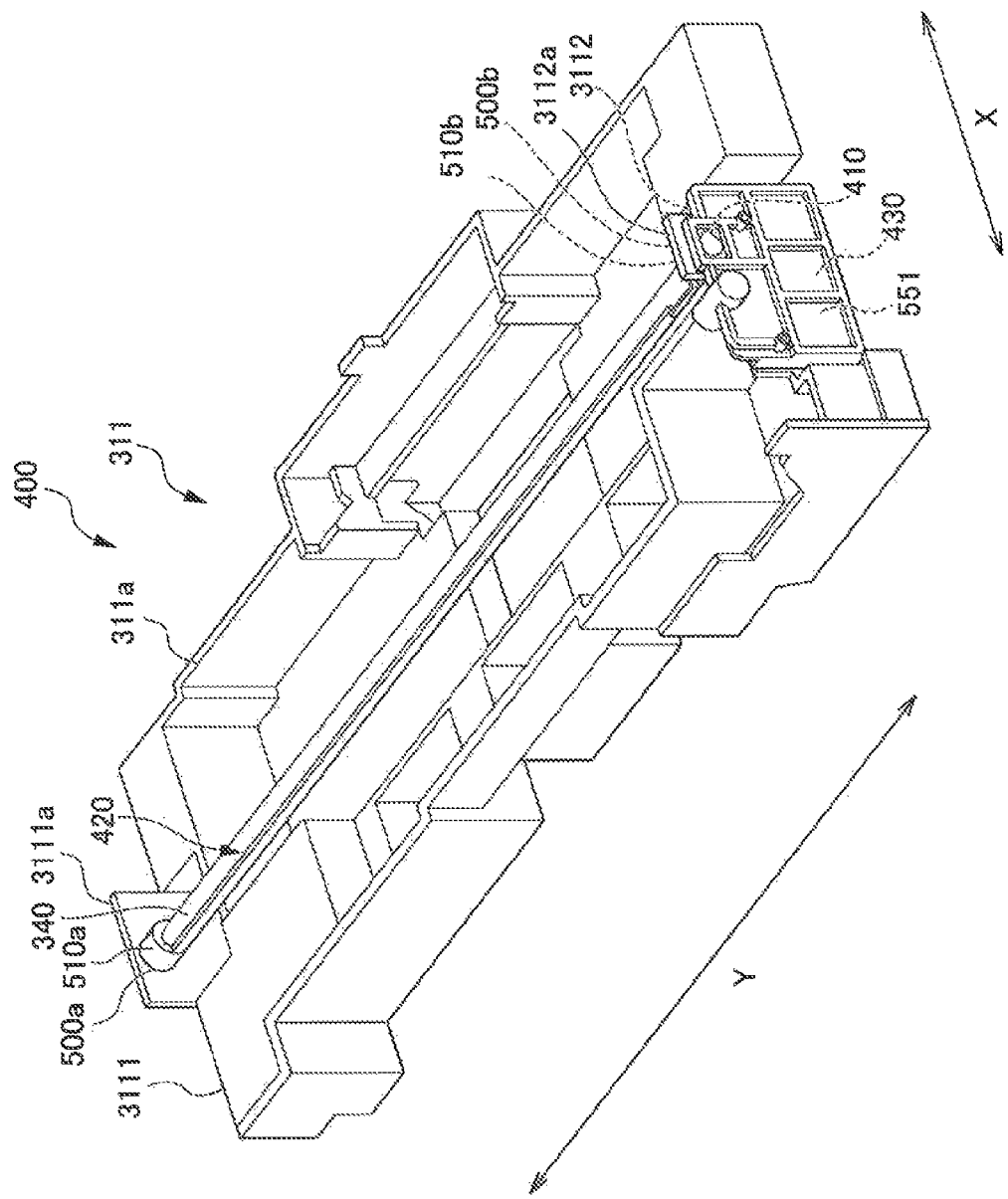
FIG. 3 is a perspective view of the light emitting unit 400, in which a cover member 311b and a cover member 311c are removed from the state shown in FIG. 2.

As shown in FIGS. 2 and 3, the first frame 311 includes a main frame part 311a with a substantially box-like shape having an open top portion and two cover members 311b and 311c that cover the open top portion of the main frame part 311a.

As shown in FIG. 3, the main frame part 311a has outer wall portions 3111 and 3112 that are disposed opposite to each other on both outer sides of the frame part 311a with respect to the main scanning direction Y.

The holding member 420 is positioned and held on a top face of the outer wall portion 3111 and the outer wall portion 3112 via a positioning portion 500.

The positioning portion 500 is formed integrally with the main frame part 311a. The positioning portion 500 holds and positions the holding member 420. The positioning portion 500 positions to restrict the holding member 420 from moving in a direction transverse to the main scanning direction Y.

The positioning portion 500 has a first positioning portion 500a formed on a side of the outer wall portion 3111 and a second positioning portion 500b formed on a side of the outer wall portion 3112.

The first positioning portion 500a is disposed in a backward side in an insertion direction K (see FIG. 13A) of the holding member 420 in the main frame part 311a.

The second positioning portion 500b is disposed in a forward side in the insertion direction K (see FIG. 13A) of the holding member 420 in the main frame part 311a.

The first positioning portion 500a is formed continuously to an upper portion of the outer wall portion 3111. The first positioning portion 500a is formed continuously to and integrally with the main frame part 311a. More specifically, the first positioning portion 500a is formed at a support wall 3111a extending upward from the outer wall portion 3111.

Figure 4A:
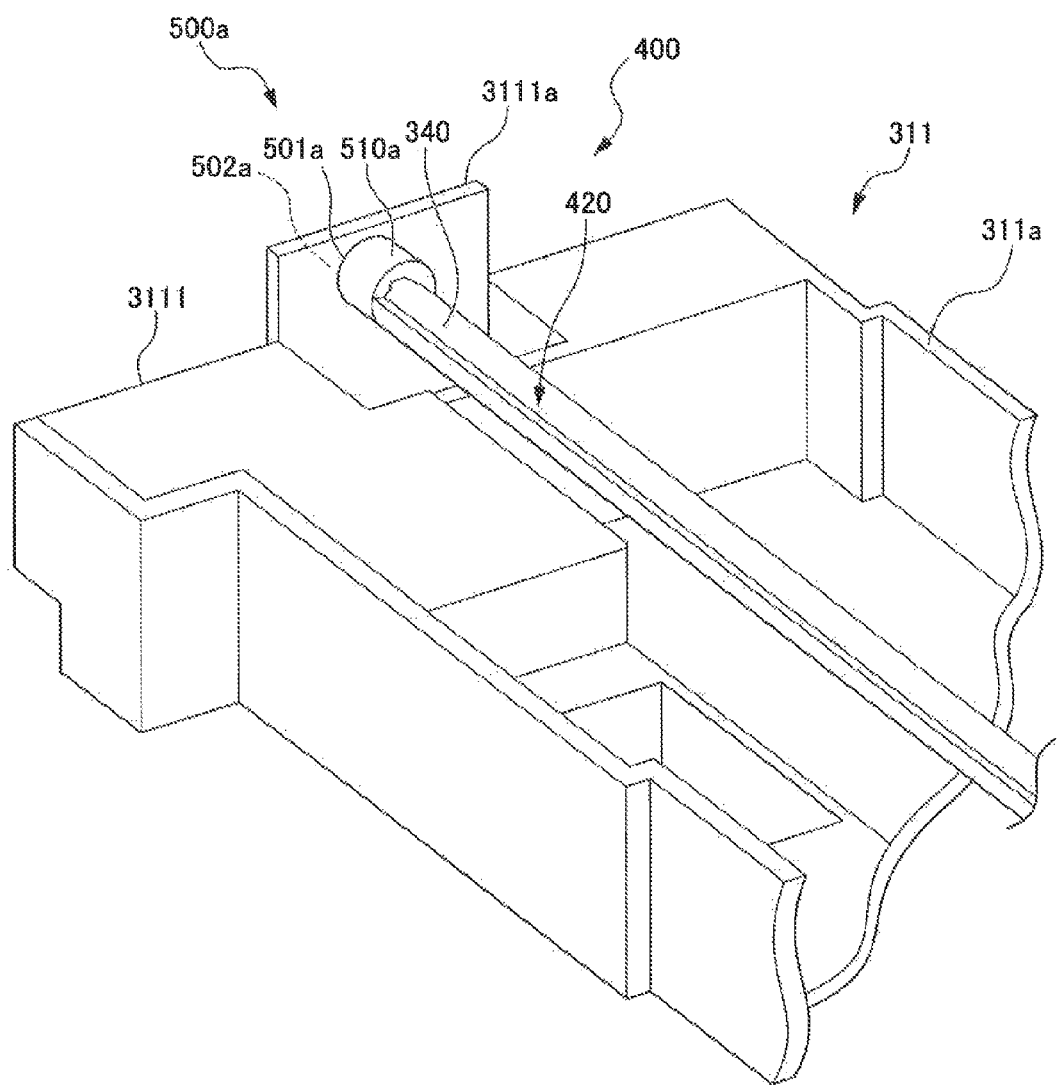
FIG. 4A is a diagram illustrating the light emitting unit 400 in a state where a holding member 420 is attached to a first frame 311.

The first positioning portion 500a has a cylindrical inner face 501a and a hollow portion 502a formed by the inner face 501a (see FIG. 4A).

Figure 4B:
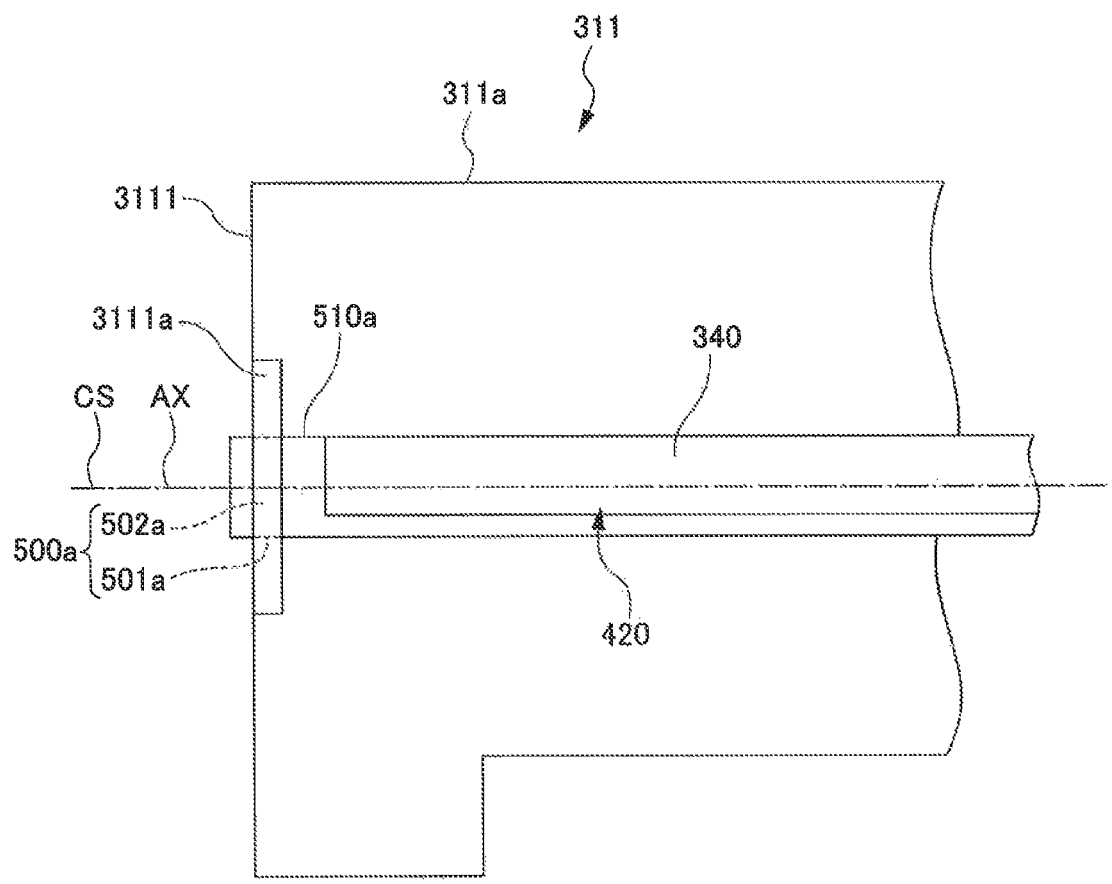
FIG. 4B is a diagram illustrating the light emitting unit 400 in a state where the holding member 420 is attached to the first frame 311.
Figure 5:
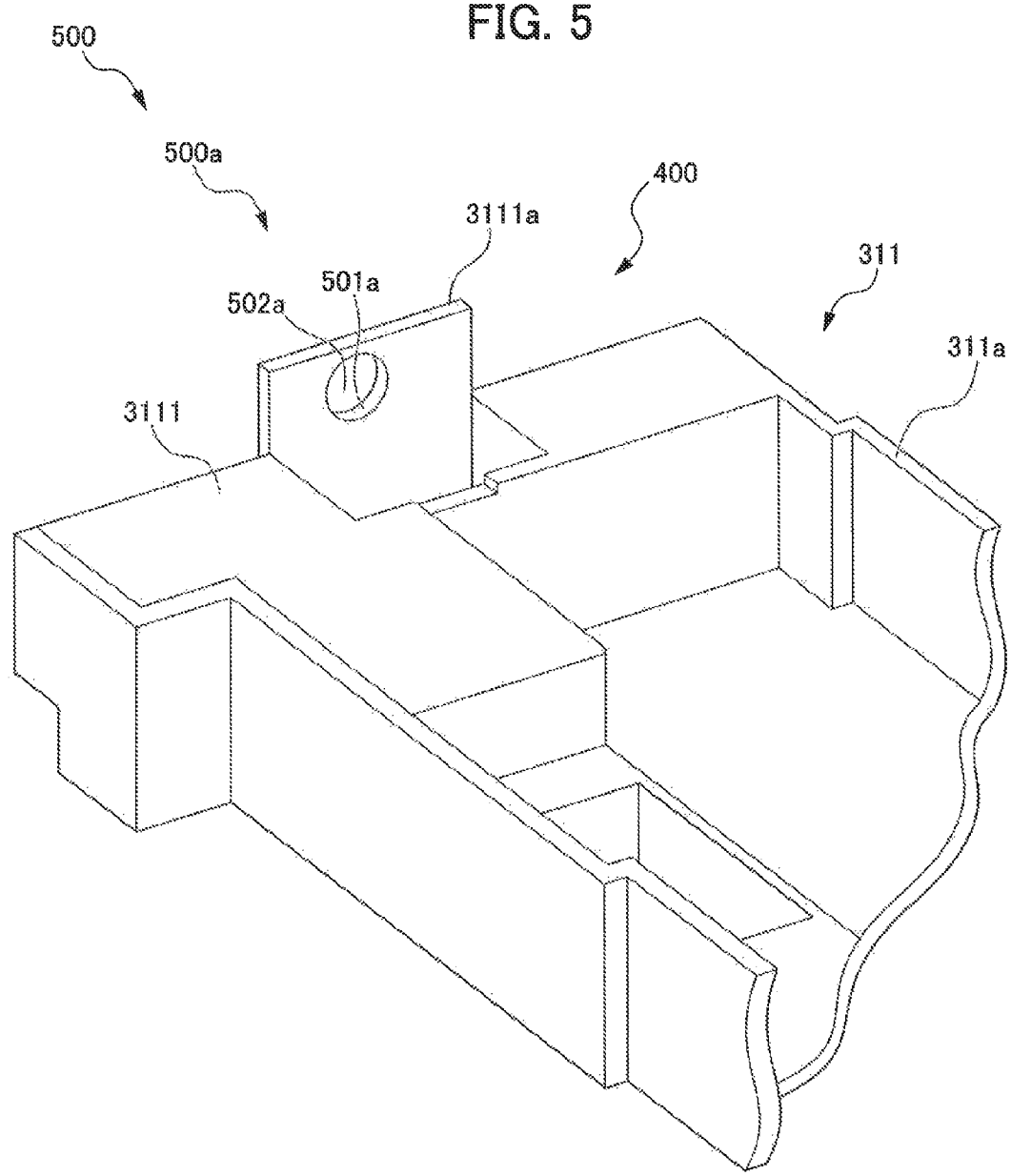
FIG. 5 is a diagram illustrating the light emitting unit 400 in a state where the holding member 420 is not attached.
Figure 6:
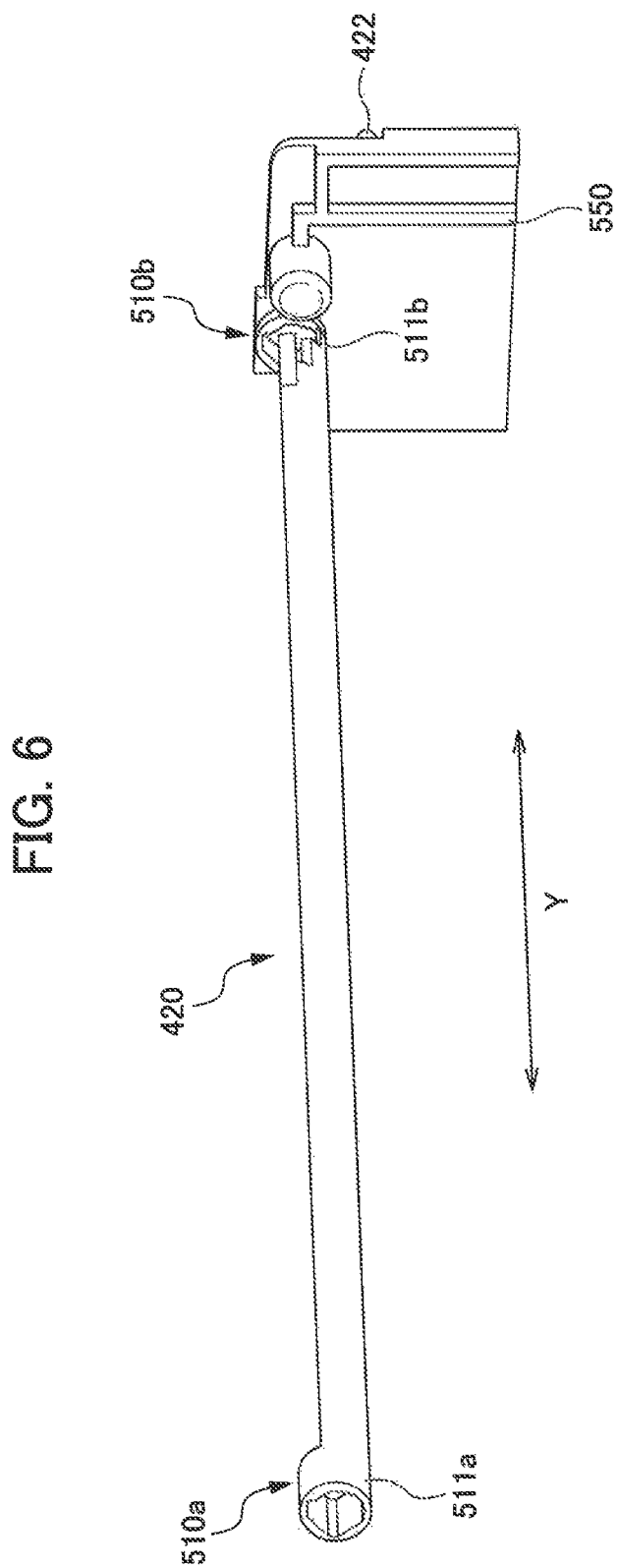
FIG. 6 is a perspective view illustrating the holding member 420.

With respect to the first positioning portion 500a, a central axis CS of the cylindrical hollow portion 502a is substantially coaxial with an optical axis AX of the light guiding member 340 in a state where the first positioned portion 510a is inserted into the cylindrical hollow portion 502a (see FIG. 4B).

In other words, the inner face 501a has a cylindrical shape, of which center is the optical axis AX. Moreover, the hollow portion 502a has a cylindrical shape, of which center is the optical axis AX.

In addition, the inner face 501a of the first positioning portion 500a is configured to correspond to an outer cylindrical face of the first positioned portion 510a (to be described below).

The first positioned portion 510a (to be described below) is inserted into and mated with the first positioning portion 500a.

The first positioning portion 500a restricts the first positioned portion 510a inserted into the first positioning portion 500a from moving in a direction transverse to the main scanning direction Y.

For example, the first positioning portion 500a restricts the first positioned portion 510a from moving in a direction perpendicular to the main scanning direction Y.

As a result, the holding member 420 is accurately positioned.

The first positioning portion 500a supports the holding member 420 so as to be movable in the main scanning direction (an optical axis direction AX).

Moreover, the first positioning portion 500a supports the first positioned portion 510a so as to be rotatable around the optical axis AX.

The second positioning portion 500b is formed continuously to an upper portion of the outer wall portion 3112. The second positioning portion 500b is formed continuously to and integrally with the main frame part 311a. More specifically, the second positioning portion 500b is formed on a support wall 3112a extending upward from the outer wall portion 3112.

The second positioning portion 500b has a cylindrical inner face 501b and a hollow portion 502b formed by the inner face 501b (see FIG. 13A).

With respect to the second positioning portion 500b, the central axis CS of the cylindrical hollow portion 502b is substantially coaxial with the optical axis AX of the light guiding member 340 in a state where the second positioned portion 510b is inserted into the hollow portion 502b.

In other words, the inner face 501b has a cylindrical shape, of which center is the optical axis AX. Moreover, the hollow portion 502b has a cylindrical shape, of which center is the optical axis AX.

In addition, the inner face 501b of the second positioning portion 500b is configured to correspond to an outer cylindrical face of the second positioned portion 510b (to be described below).

The second positioned portion 510b (to be described below) is inserted into and mated with the second positioning portion 500b.

The second positioning portion 500b restricts the second positioned portion 510b inserted into the second positioning portion 500b from moving in a direction transverse to the main scanning direction Y.

For example, the second positioning portion 500b restricts the second positioned portion 510b from moving in a direction perpendicular to the main scanning direction Y.

The second positioning portion 500b restricts the second positioned portion 510b from moving in the direction transverse to the main scanning direction Y and accurately positions the holding member 420.

The second positioning portion 500b supports the holding member 420 so as to be movable in the main scanning direction (the optical axis direction AX).

Moreover, the second positioning portion 500b supports the second positioned portion 510b so as to be rotatable around the optical axis AX.

When the holding member 420 is attached to the main frame part 311a, the first positioned portion 510a penetrates the second positioning portion 500b (see FIGS. 13A and 13B) More specifically, the first positioned portion 510a penetrates the second positioning portion 500b, and thereafter the second positioned portion 510b is mated with the second positioning portion 500b.

In other words, an inner diameter of the second positioning portion 500b is configured to allow not only the first positioned portion 510a to penetrate, but also the second positioned portion 510b not to penetrate but to mate with.

In the present embodiment, an inner diameter of the cylindrical hollow portion 502b of the second positioning portion 500b is larger than an inner diameter of the cylindrical hollow portion 502a of the first positioning portion 500a.

The first positioning portion 500a and the second positioning portion 500b hold to restrict the holding member 4120 from moving in the direction transverse to the optical axis AX via the first positioned portion 510a and the second positioned portion 510b.

Here, the first positioning portion 500a and the second positioning portion 500b support the holding member 420 so as to be movable in the direction of the optical axis AX (the main scanning direction Y) via the first positioned portion 510a and the second positioned portion 510b.

Moreover, the first positioning portion 500a and the second positioning portion 500b support the holding member 420 so as to be rotatable around the optical axis AX via the first positioned portion 510a and the second positioned portion 510b. In a state where the holding member 420 is attached to the main frame part 311a, the lighting unit 400 (the image reading device 300) causes the holding member 420 to rotate to change (adjust) an angle of irradiating a document with light from the light guiding member 340 (an orientation of a light irradiating portion 341 to be described below).

The holding member 420 is positioned and held to the main frame part 331a by the positioning portion 500.

The holding member 420 is held to the main frame part 311a in a state of being restricted from moving in the direction transverse to the main scanning direction Y (the optical axis direction AX) by the positioning portion 500.

In addition, as will be described later, the holding member 420 positions the LED 410 via an LED substrate 430, and positions the light guiding member 340.

The holding member 420 has a positioned portion 530 that is formed at an end portion of the holding member 420 in the main scanning direction Y (the optical axis direction AX). The positioned portion 510 is inserted into and mated with the positioning portion 500.

Moreover, the holding member 420 has a restricting portion 550 that restricts rotational movement around the optical axis AX.

The positioned portion 510 has the first positioned portion 510a and the second positioned portion 510b.

The first positioned portion 510a is formed at the holding member 420 on a side of the first positioning portion 500a in the main scanning direction Y.

The second positioned portion 510b is formed at the holding member 420 on a side of the second positioning portion 500b in the main scanning direction Y.

The first positioned portion 510a has a cylindrical outer face 511a centered about the optical axis AX, which is configured to correspond to the inner face 501a of the first positioning portion 500a.

The first positioned portion 510a is inserted into and mated with the first positioning portion 500a.

The first positioned portion 510a is inserted into the hollow portion 502a of the first positioning portion 500a, and the outer face 511a is in surface contact with the inner face 501a.

The first positioned portion 510a is held to the first positioning portion 500a such that the central axis CS of the cylindrical outer face 511a is positioned to be substantially coaxial with the optical axis AX of the light guiding member 340.

The first positioned portion 510a inserted into the first positioning portion 500a is held to the first positioning portion 500a, such that the first positioned portion 510a is restricted from moving in the direction transverse to the main scanning direction Y.

Accordingly, the first positioned portion 510a is restricted from moving in the direction perpendicular to the main scanning direction Y.

Here, the first positioned portion 510a is supported by the first positioning portion 500a so as to be rotatable about the optical axis AX.

The second positioned portion 510b has a cylindrical outer face 511b centered about the optical axis AX, which is configured to correspond to the inner face 501b of the second positioning portion 500b.

The second positioned portion 510b is inserted into and mated with the second positioning portion 500b. The second positioned portion 510b is inserted into the hollow portion 502b of the second positioning portion 500b, and the outer face 511b is in surface contact with the inner face 501b.

The second positioned portion 510b is held to the second positioning portion 500b such that the central axis CS of the cylindrical outer face 511b is positioned to be substantially coaxial with the optical axis AX of the light guiding member 340.

The second positioned portion 510b inserted into the second positioning portion 500b is held to the second positioning portion 500b, such that the second positioned portion 510b is restricted from moving in the direction transverse to the main scanning direction Y.

Accordingly, the second positioned portion 510b is restricted from moving in the direction perpendicular to the main scanning direction Y.

Here, the second positioned portion 510b is supported by the second positioning portion 500b so as to be rotatable about the optical axis AX.

Figure 13B:
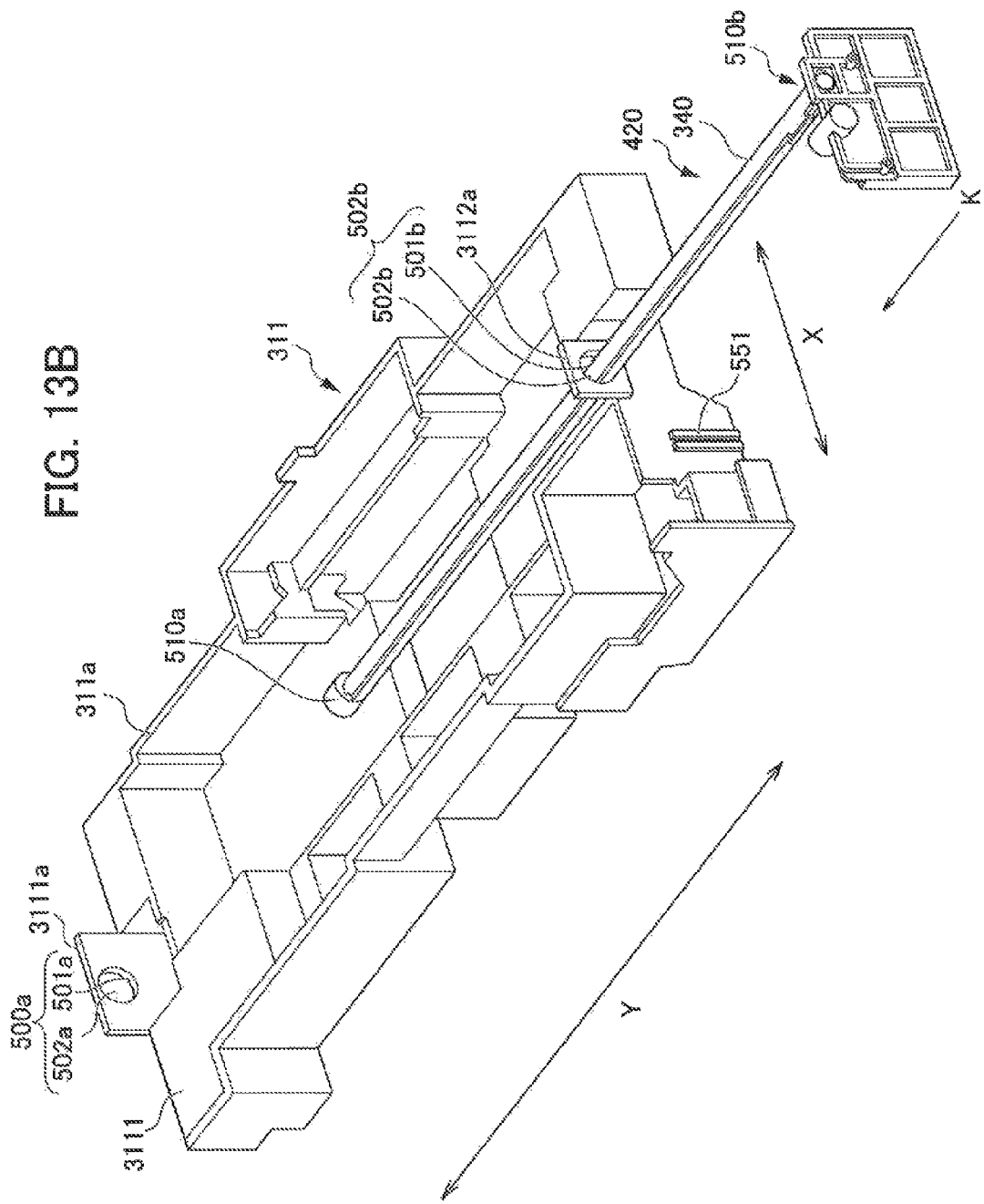
FIG. 13B is a diagram illustrating steps for attaching the holding member 420 to the first frame 311.
Figure 13D:
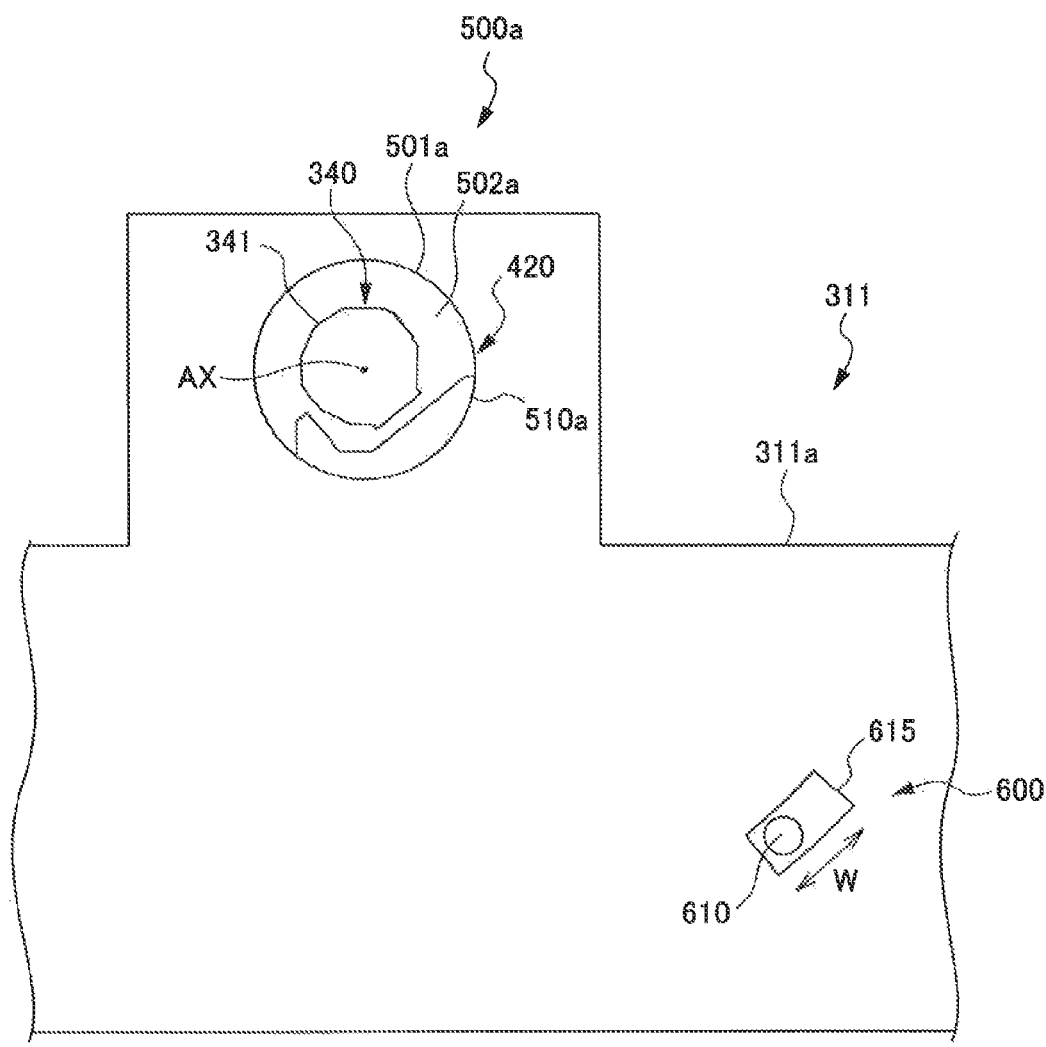
FIG. 13D is a diagram illustrating steps for adjusting an angular position of the holding member 420 being attached to the first frame 311.

When the holding member 420 is attached to the main frame part 311a, the first positioned portion 510a penetrates the second positioning portion 500b (see FIGS. 13A and 13B). More specifically, the first positioned portion 510a penetrates the second positioning portion 500b, and is subsequently mated with the first positioning portion 500a.

In other words, the first positioned portion 510a has an outer diameter that allows the first positioned portion 510a not only to penetrate the second positioning portion 500b, but also to mate with the first positioning portion 500a.

In the present embodiment, an outer diameter of the cylindrical outer face 511a of the first positioned portion 510a is smaller than an outer diameter of the cylindrical outer face 511b of the second positioned portion 510b.

As a result, it is possible for the image reading device to position and hold the holding member 420 to the main frame part 311a with high accuracy, by inserting the holding member 420 with the first positioned portion 510a as a top into the second positioning portion 500b, and further moving the holding member 420 in the insertion direction.

The first positioned portion 510a and the second positioned portion 510b are held to the holding member 420 so as to be restricted from moving in the direction transverse to the optical axis AX via the first positioning portion 500a and the second positioning portion 500b.

Here, the first positioned portion 510a and the second positioned portion 510b are supported by the holding member 420 so as to be movable in a direction of the optical axis AX (the main scanning direction Y) via the first positioning portion 500a and the second positioning portion 500b.

Moreover, the first positioned portion 510a and the second positioned portion 510b are supported by the holding member 420 so as to be rotatable about the optical axis AX via the first positioning portion 500a and the second positioning portion 500b. As described above, in a state where the holding member 420 is attached to the main frame part 311a, the lighting unit 400 (the image reading device 300) causes the holding member 420 to rotate to change (adjust) an angle of irradiating a document with light from the light guiding member 340 (an orientation of the light irradiating portion 341 to be described below).

The restricting portion 550 restricts rotational movement about the optical axis AX.

The restricting portion 550 is formed on a plate-like member 427 disposed at an end of the holding member 420 on a side of the second positioned portion 510b.

The restricting portion 550 is a rib formed at an inner face of the plate-like member 427, in the main scanning direction Y.

The restricting portion 550 is engaged with a groove 551, which is formed on an outer side of the outer wall portion 3112, to restrict rotational movement about the optical axis AX.

As shown in FIG. 83, the light guiding member 340 and the LED substrate 430 (LED 410) are positioned to the holding member 420 with a predetermined positional relationship. Since the holding member 420 is positioned and held to the main frame part 311a, the light guiding member 340 and the LED 410, which are positioned to the holding member 420, are positioned with respect to the main frame part 311a.

The holding member 420 described above has a first holding portion 422, a second holding portion 423, and a light reflecting portion 421.

The holding member 420 holds the LED 410 by the first holding portion 422, such that the optical axis AX of the LED 410 is aligned with the main scanning direction Y. Moreover, the holding member 420 holds the light guiding member 340 by the second holding portion 423, such that the central axis CS of the light guiding member 340 is substantially coaxial with the optical axis AX.

Descriptions are hereinafter provided in detail for the LED 410, the LED substrate 430, the light guiding member 340 and the holding member 420.

The LED 410 is a Light Emitting Diode (LED) that functions as the light emitting portion. In the present embodiment, a single LED 410 is employed.

The LED 410 is disposed on a side of a tip end 340b of the light guiding member 340. More specifically, the LED 410 is disposed such that a light emitting face thereof faces an end face of the tip end 340b of the light guiding member 340. The LED 410 emits light toward the end face of the tip end 340b.

Figure 9:
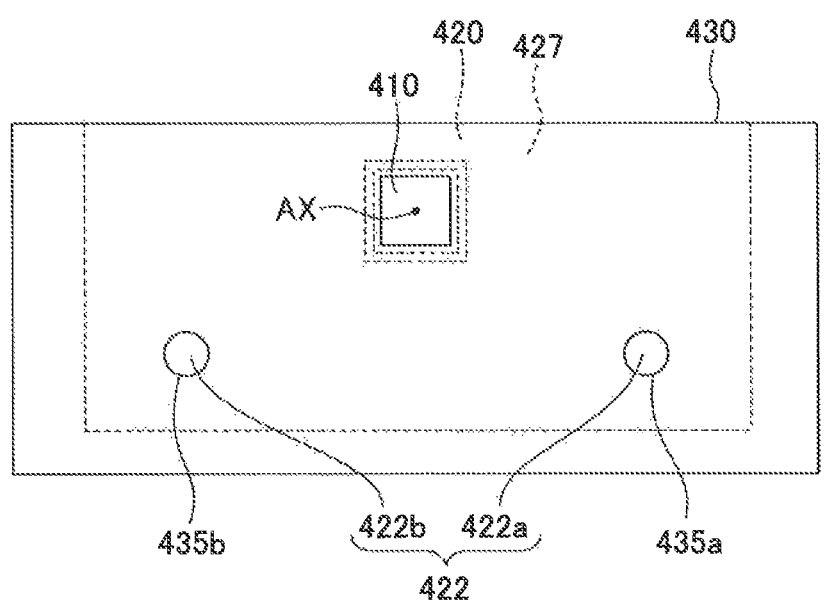
FIG. 9 is a diagram illustrating a setup for positioning a plate-like member 427 of the holding member 420 and an LED substrate 430.

As shown in FIG. 9, the LED 410 is mounted on the LED substrate 430.

The LED substrate 430 is positioned and held at a predetermined position (a predetermined orientation) of the holding member 420 by the first holding portion 422 that is formed on an end side of the holding member 420.

As shown in FIG. 9, the first holding portion 422 has a pair of positioning protrusions 422a and 422b. The positioning protrusions 422a and 422b protrude from an outer surface of the plate-like member 427.

The positioning protrusions 422a and 422b are mated with positioning holes 435a and 435b of the LED substrate 430. The positioning protrusions 422a and 422b position the LED 410 mounted on the LED substrate 430 such that the light emitting face of the LED 41.0 faces the end face of the light guiding member 340 on a side of the tip end 340b in the main scanning direction Y.

The positioning protrusions 422a and 422b (the first holding portion 422) indirectly position and hold the LED 410 via the LED substrate 430.

Figure 11:
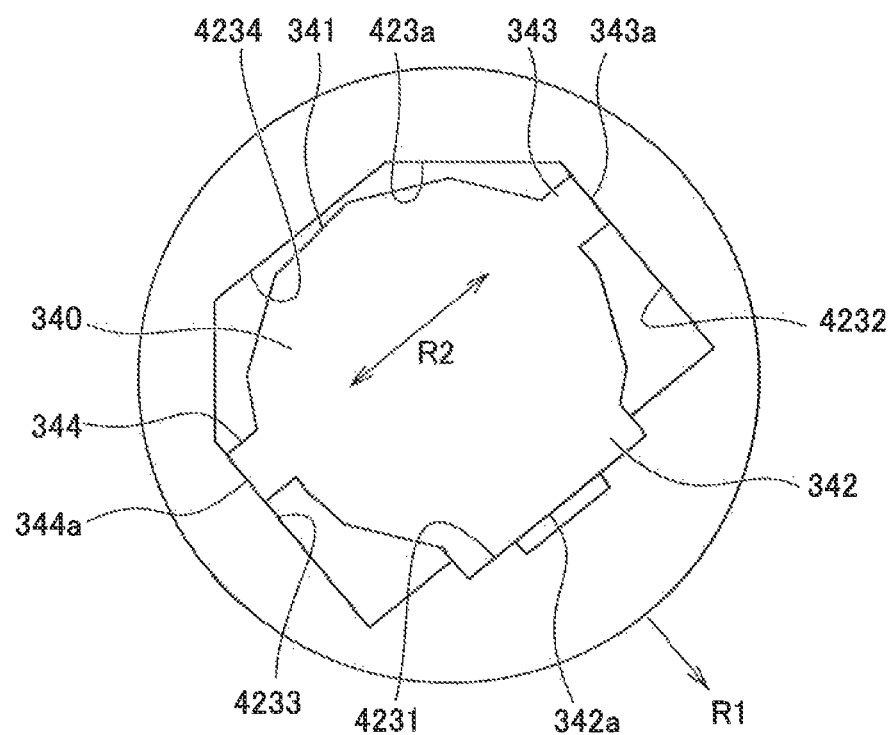
FIG. 11 is a diagram illustrating a setup for positioning a base end hole 423a formed at the holding member 420 and a base end of the light guiding member 340.
Figure 12:
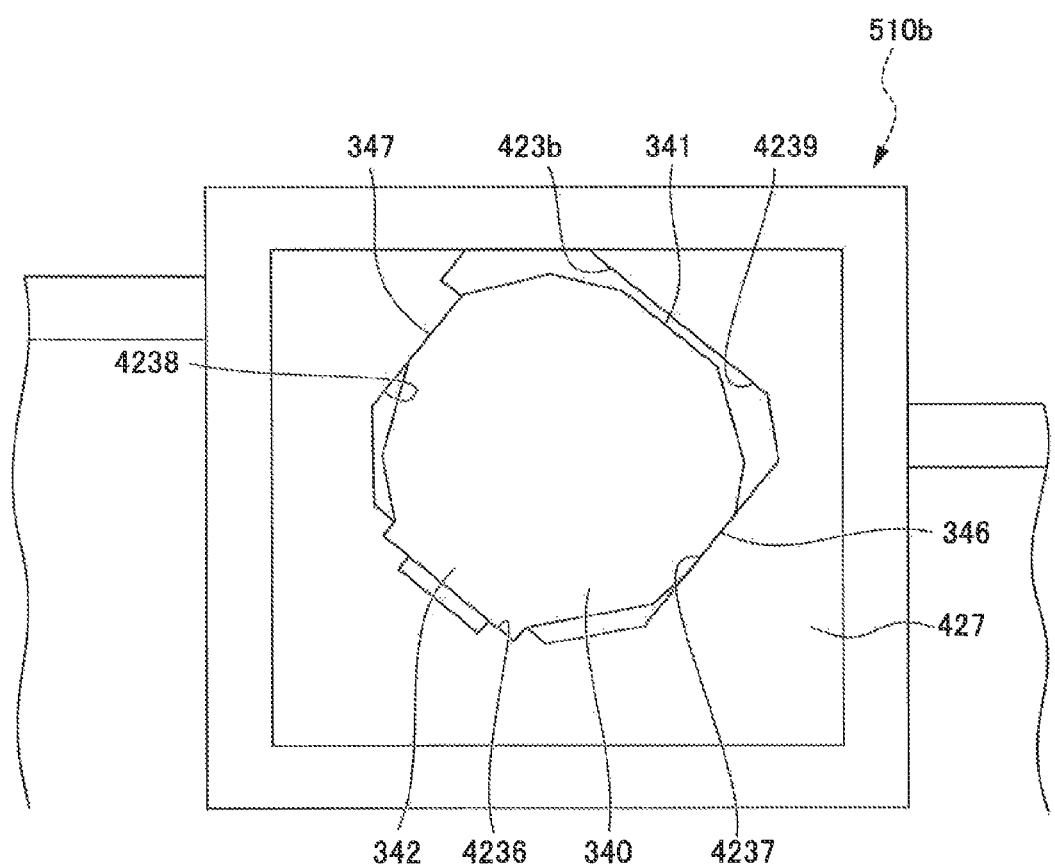
FIG. 12 is a diagram illustrating a setup for positioning a tip end hole 423b formed in the plate-like member 427 of the holding member 420 and a tip end of the light guiding member 340.

As shown in FIG. 2, the light guiding member 340 is a stick-like light guiding member that is disposed along the main scanning direction Y. As shown in FIGS. 11 and 12, a cross-sectional shape of the light guiding member 340 is substantially polygonal. The light guiding member 340 is a light guiding member that is composed of acrylic resin or the like.

Both ends of the light guiding member 340 are positioned and held by the holding member 420.

More specifically, the tip end 340b is positioned and held to the second holding portion 423 (a tip end hole portion 423b) that is formed in the holding member 420. The base end 340a is positioned and held to the second holding portion 423 (a base end hole portion 423a). Accordingly, the light guiding member 340 is positioned and held to the holding member 420.

An end face on a side of the tip end 340b of the light guiding member 340 is disposed to face the light emitting face of the LED 410.

The light guiding member 340 guides light, which is emitted from the LED 410 disposed on the side of the tip end 340b, not only in a longitudinal direction (the main scanning direction) of the light guiding member 340, but also to the light irradiating portion 341 (to be described later).

The light guiding member 340 has the light irradiating portion 341 that is formed at a part of an outer periphery along the main scanning direction Y. The light irradiating portion 3411 emits internally-guided light outside.

The light irradiating portion 341 is disposed in a predetermined direction, such that the first reader surface 302A or the second reader surface 302B can be irradiated with light, in a state where the light guiding member 340 is held to the first frame 311 via the holding member 420.

Figure 10:
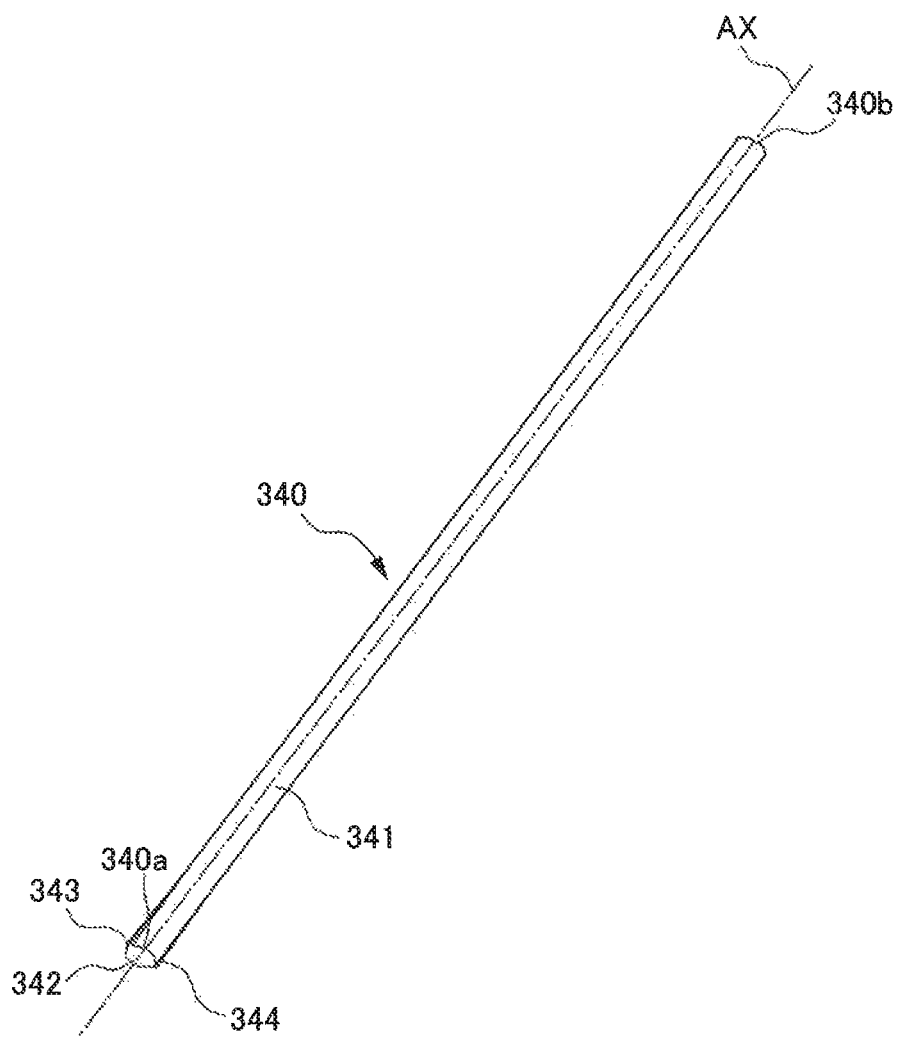
FIG. 10 is a perspective view of the light guiding member 340.

Moreover, as shown in FIG. 10, the light guiding member 340 has convex portions 342, 343 and 344 on the outer periphery, which extend along the longitudinal direction (the main scanning direction Y). The purpose of the convex portions 342, 343 and 344 is to prevent the light guiding member 340 from being attached in a wrong orientation when the light guiding member 340 is held to the holding member 420 during production.

As shown in FIG. 11, the convex portion 342 is located on the outer periphery substantially opposite to (in an opposite position of) the light irradiating portion 341.

As shown in FIGS. 10 to 12, the convex portion 342 extends over an entirety of the light guiding member 340 in the longitudinal direction thereof. A tip face 342a of the convex portion 342 is a flat face that is orthogonal to a protruding direction (a direction indicated by an arrow R1 in FIG. 11) of the convex portion 342.

The convex portions 343 and 344 each lie between the light irradiating portion 341 and the convex portion 342 on the outer periphery. The convex portion 343 and the convex portion 344 are located to be opposite to each other. As shown in FIG. 11, protruding directions of the convex portion 343 and the convex portion 344 are each configured to be aligned with a direction (a direction indicated by an arrow R2) orthogonal to the protruding direction (the direction indicated by the arrow R1) of the convex portion 342.

As shown in FIG. 10, the convex portions 343 and 344 each lie on the side of the base end 340a of the light guiding member 340.

More specifically, the convex portions 343 and 344 are each formed only in a predetermined range of length from the base end 340a, but not formed on a side of the tip end 340b.

In addition, as shown in FIG. 10, each of the convex portions 343 and 344 is configured to be a tapered ridge, in which a protruding height in a radial direction of the light guiding member 340 progressively decreases as a distance from the base end 340a increases. Moreover, a tip face 343a of the convex portion 343 and a tip face 344a of the convex portion 344 are flat faces that are orthogonal to the protruding direction (the direction indicated by the arrow R2) shown in FIG. 11.

Figure 8:
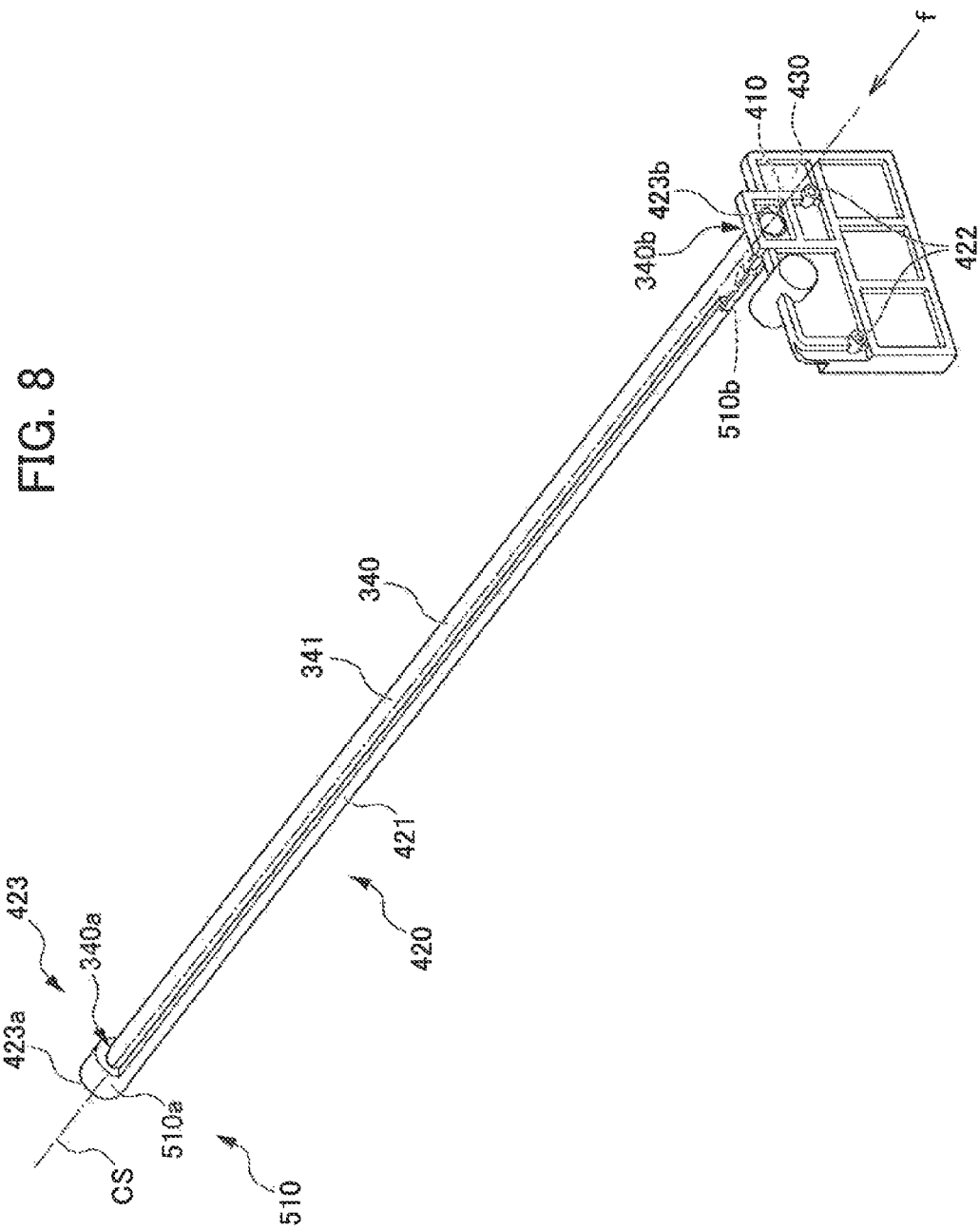
FIG. 8 is a perspective view illustrating the holding member 420 holding the light guiding member 340.

As shown in FIG. 8, the holding member 420 has the light reflecting portion 421, the first holding portion 422, the second holding portion 423, and the positioned portion 510 (the first positioned portion 510a and the second positioned portion 510b). The holding member 420 positions and holds the LED 410 and the light guiding member 340 in predetermined positions and orientations.

As shown in FIG. 8, the light reflecting portion 421 is disposed to face the light irradiating portion 341 on the outer peripheral surface of the light guiding member 340. The light reflecting portion 421 is disposed to face the light guiding member 340 over an entirety thereof in the longitudinal direction (the main scanning direction Y).

The light reflecting portion 421 is disposed on the outer periphery of the light guiding member 340, and has an inner light-reflecting face. When light is emitted from the outer periphery of the light guiding member 340 toward the inner face (the light is leaked from the light guiding member 340), the inner face reflects the light toward the light guiding member 340. When the light is leaked from the light guiding member 340, the inner face reflects the light in the same direction as a direction of the light emitted from the light irradiating portion 341, thereby increasing the irradiation efficiency of the light guiding member 340.

As shown in FIG. 9, the first holding portion 422 has the pair of positioning protrusions 422a and 422b formed on the plate-like member 427.

The positioning protrusions 422a and 422b are inserted into the positioning holes 435a and 435b of the LED substrate 430, thereby positioning and holding the LED substrate 430.

The positioning protrusions 422a and 422b (the first holding portion 422) position and hold the LED 410 mounted on the LED substrate 430 via the LED substrate 430, such that the LED 410 faces the end face of the light guiding member 340 on a side of the ti end 340b.

The positioning protrusions 422a and 422b (the first holding portion 422) hold the LED 410, such that the optical axis AX is aligned with the main scanning direction Y.

Here, in the present embodiment, the optical axis AX refers to a central line (axis) of emitted beams of light. The optical axis AX is formed, for example, along a direction perpendicular to a light-emitting surface. The optical axis AX is, for example, a line (axis) that extends from a center of gravity of the light-emitting surface in a planar shape in a direction perpendicular to the light-emitting surface.

For a case where the planar shape of the light-emitting surface is square or rectangular, the optical axis AX is, for example, a line (axis) that extends from an intersecting point of diagonal lines thereof in a direction perpendicular to the light-emitting surface. Moreover, for a case where the planar shape of the light-emitting surface is circular, the optical axis AX is, for example, a line (axis) that extends from a central point thereof in a direction perpendicular to the light-emitting surface.

The holding member 420 has the base end hole portion 423a and the tip end hole portion 423b.

The base end 340a of the light guiding member 340 is mated with the base end hole portion 423a. The tip end 340b of the light guiding member 340 is mated with the tip end hole portion 423b. In this manner, the holding member 420 positions and holds the light guiding member 340.

The base end hole portion 423a and the tip end hole portion 423b (the second holding portion 423) position the light guiding member 340, such that the light guiding member 340 is located in a predetermined positional relationship with the light reflecting portion 421, and hold the light guiding member 340 such that the central axis CS is substantially coaxial with the optical axis.

Here, in the present embodiment, the central axis CS refers to a central line (axis) that extends in a longitudinal direction of the light guiding member 340. The central axis CS is, for example, a line (axis) that passes through the center of a cross section of the light guiding member 340, and extends in the longitudinal direction thereof.

The central axis CS is, for example, a line (axis) that passes through a center of gravity of a cross section of the light guiding member 340 perpendicular to the longitudinal direction and extends in the longitudinal direction.

For a case where the planar shape of the light-emitting surface is square or rectangular, the central axis CS is, for example, a line (axis) that passes through an intersecting point of diagonal lines thereof, and extends in the longitudinal direction. Moreover, for a case where the planar shape of the light-emitting surface is circular, the central axis CS is, for example, a line (axis) that passes through a central point thereof, and extends in the longitudinal direction.

As shown in FIG. 11, the base end hole portion 423a is a substantially hexagonal through-hole that is formed in the holding member 420.

The base end hole portion 423a includes a guiding groove 4231, a first flat edge 4232, a second flat edge 4233 and a contactless edge 4234. The convex portion 342 of the light guiding member 340 mates with the guiding groove 4231 slidably in the main scanning direction Y. The tip face 343a of the convex portion 343 is in surface contact with the first flat edge 4232 slidably in the main scanning direction Y. The tip face 344a of the convex portion 344 is in surface contact with the second flat edge 4233 slidably in the main scanning direction Y. The contactless edge 4234 faces the guiding groove 4231 in the inner periphery edge, and is not in contact with the outer periphery of the light guiding member 340.

The base end hole portion 423a positions the base end 340a of the light guiding member 340, such that the base end 340a is restricted from rotating and moving in the main scanning direction Y, through mating of the convex portion 343 with the guiding groove 4231, surface contact of the first flat edge 4232 with the convex portion 342, and surface contact of the second flat edge 4233 with the convex portion 344.

Here, the guiding groove 4231 is configured to guide movement of the light guiding member 340, and suppresses the light guiding member 340 from being inserted in an irregular manner (at a different rotation angle).

As shown in FIG. 12, the tip end hole portion 423b is a substantially square through-hole that is formed in the plate-like member 427 of the holding member 420.

The tip end hole portion 423b includes a guiding groove 4236, a third flat edge 4237, a fourth flat edge 4238 and a contactless edge 4239. The convex portion 342 of the light guiding member 340 mates with the guiding groove 4236 slidably in the main scanning direction Y. A first outer peripheral plane 346 forming an outer periphery of the light guiding member 340 is in surface contact with the third flat edge 4237 slidably in the main scanning direction Y. A second outer peripheral plane 347 facing the first outer peripheral plane 346 is in surface contact with the fourth flat edge 4238 slidably in the main scanning direction Y. The contactless edge 4239 faces the guiding groove 4236, and is not in contact with the outer periphery of the light guiding member 340.

The tip end hole portion 423b positions the tip end 340b of the light guiding member 340, such that the tip end 340b is restricted from rotating and moving in the main scanning direction Y through mating the convex portion 342 with the guiding groove 4236, surface contact of the third flat edge 4237 with the first outer peripheral plane 346 and surface contact of the fourth flat edge 4238 with the second outer peripheral plane 347.

As described above, both ends of the light guiding member 340 in the main scanning direction Y are held to the holding member 420 by the second holding portion 423 (423a and 423b). The light guiding member 340 is positioned and held to the holding member 420 in a state of being spaced away from the light reflecting portion 421. Both ends of the light guiding member 340 are in contact with the holding member 420, and an intermediate portion of the light guiding member 340 is maintained spaced away from the holding member 420. Accordingly, even if the light guiding member 340 is deformed due to thermal expansion or the like, the light guiding member 340 is prevented from being in contact with the light reflecting portion 421. As a result, the light reflecting portion 421 is prevented from being deformed due to thermal expansion of the light guiding member 340.

In the present embodiment, the LED 410 is positioned and held to the holding member 420 by the first holding portion 422 via the LED substrate 430. Moreover, the light guiding member 340 is positioned and held to the holding member 420 by the second holding portion 423.

In other words, the holding member 420 positions and holds the LED 410 and the light guiding member 340.

In addition, the holding member 420 is positioned and held to the main frame part 311a (the first frame 311).

As a result, such a simple configuration provides the image reading device 300 (the light emitting unit 400), in which the LED 410 and the light guiding member 340 are accurately positioned.

Furthermore, the lighting unit 400 (the image reading device 300) includes the adjustment mechanism 600 (see FIG. 7) that is capable of adjusting the light irradiating portion 341 (the orientation of the light) after assembly.

The adjustment mechanism 600 causes the holding member 420 to rotationally move, such that the light guiding member 340 rotates around the optical axis AX.

The adjustment mechanism 600 is directly or indirectly coupled to the holding member 420, and causes the holding member 420 to rotate such that the light guiding member 340 rotates around the optical axis AX.

The adjustment mechanism 600 is configured to apply a force to the holding member 420 in a circumferential direction around the optical axis AX (in a direction of an arrow W).

In the present embodiment, the holding member 420 is attached to the main frame part 311a, in a state where the cylindrical positioned portion 510 is inserted into the positioning portion 500 having a cylindrical inner face.

As a result, when the adjustment mechanism 600 applies a predetermined force to the holding member 420 in the circumferential direction around the optical axis AX, the positioned portion 510 rotationally slides relative to the positioning portion 500.

In other words, since the holding member 420 rotates around the optical axis AX due to the force applied by the adjustment mechanism 600, the LED 410 and the light guiding member 340, which are positioned and held to the holding member 420, also rotate around the optical axis AX (the central axis CS).

As a result, the LED 410 rotates around the optical axis AX. Moreover, the LED 410 rotates while its positional relationship with the light guiding member 340 is maintained.

As a result, the light guiding member 340 rotates around the optical axis AX so as to change the orientation of the light irradiating portion 341.

Figure 7:
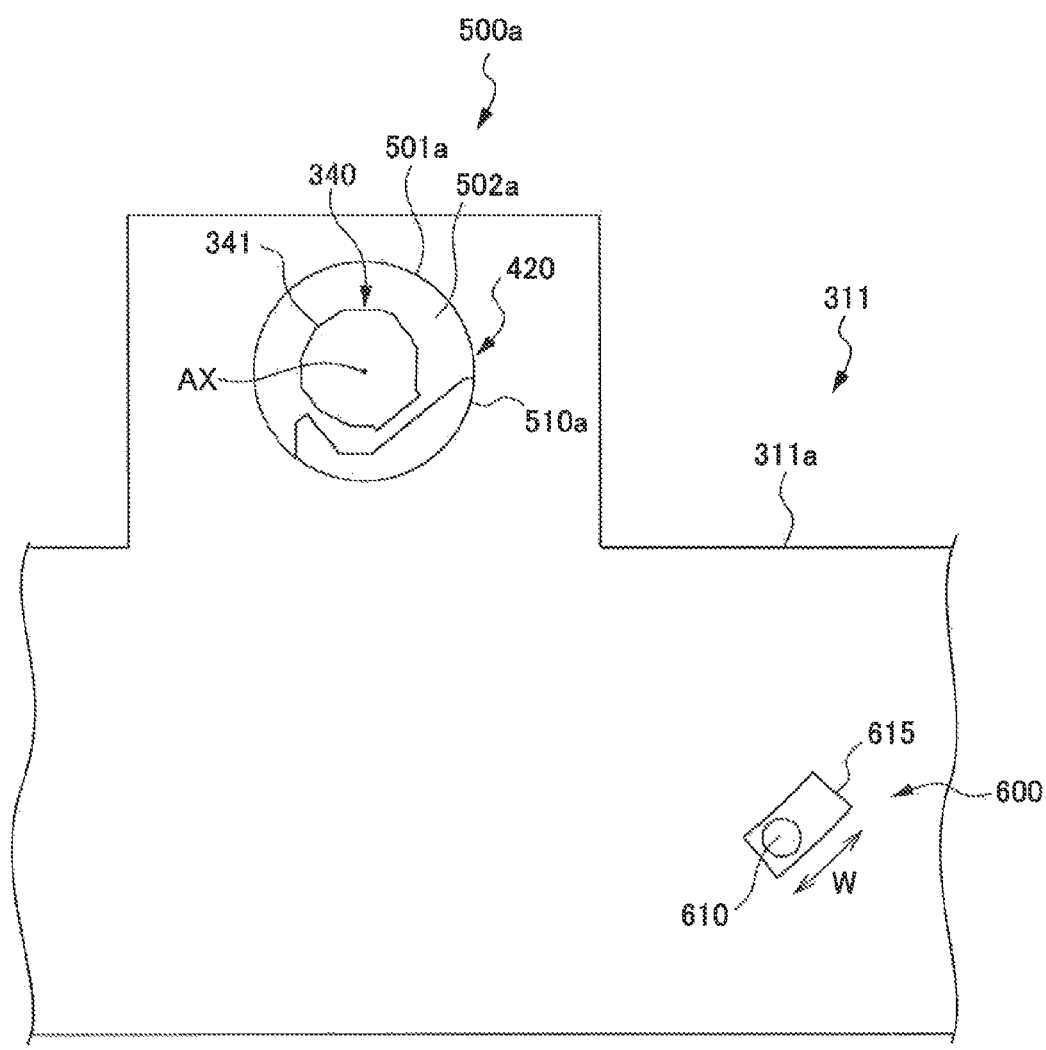
FIG. 7 is a diagram illustrating a positional relationship among a light guiding member 340, the holding member 420, and the first frame 311.

As shown in FIG. 7, the adjustment mechanism 600 has an adjustment operation portion 610 that is externally exposed.

The adjustment operation portion 610 is disposed to be exposed externally from an arcuate cutout 615 formed at the main frame part 311a.

The adjustment operation portion 610 moves (or is guided) in an arc (in the direction of the arrow W). The adjustment operation portion 610 is coupled to the holding member 420 via a transfer mechanism (not shown). For example, the transfer mechanism may include cams, gears and screws. Moreover, the transfer mechanism may be a rod member or the like that directly couples the holding member 420 with the adjustment operation portion 610.

Movement (an operation by the user) of the adjustment operation portion 610 is transferred to the holding member 420 through the transfer mechanism.

In other words, when the user moves the adjustment operation portion 610, the holding member 420 rotates around the optical axis AX at a predetermined angle.

Accordingly, the light guiding member 340, which is positioned and held to the holding member 420, rotates around the optical axis AX, thereby changing the orientation of the light irradiating portion 341.

For a case where the transfer mechanism is configured as a member directly coupling the holding member 420 with the adjustment operation portion 610, the adjustment operation portion 610 is configured to move around the optical axis AX in the circumferential direction. In such a case, it may be that the adjustment operation portion 610 is configured to be spaced away from the optical axis AX at a predetermined distance. For example, it may be that the adjustment operation portion 610 is configured to be spaced away from the optical axis AX at least 50 mm, preferably at least 80 mm, and more preferably at least 100 mm. The reason for this is that such spacing allows fine adjustment of the rotation angle of the light guiding member 340 (the orientation of the light irradiating portion 341).

Next, descriptions are provided for assembly steps of the light emitting unit 400.

Firstly, as shown in FIG. 8, an operator inserts the light guiding member 340 into the base end hole portion 423a of the holding member 420, while the tip end 340b is placed on the front side. More specifically, the operator mates the convex portion 342 with the guiding groove 4231, and inserts the tip end 340b into the base end hole portion 423a.

Subsequently, the operator further inserts the light guiding member 340 in a direction of an arrow F. In addition, the operator mates the tip end 340b of the light guiding member 340 with the tip end hole portion 423b, and mates the base end 340a with the base end hole portion 423a.

In this manner, the light guiding member 340 is held to the holding member 420, such that the positional relationship with the light reflecting portion 421 and the orientation of the light irradiating portion 341 are adjusted.

Subsequently, the operator attaches the LED substrate 430 to the holding member 420. More specifically, the operator attaches the LED substrate 430 to the holding member 420, by mating the positioning protrusions 422a and 422b (the first holding portion 422), which are formed on the holding member 420, with the positioning holes 435a and 435b, which are formed in the LED substrate 430.

As a result, the LED 410 is held via the LED substrate 430 at a position where the light emitting face of the LED 410 faces the end face of the light guiding member 340 on a side of the tip end 340b.

Subsequently, the operator attaches the holding member 420, which holds the LED 410 and the light guiding member 340, to the main frame part 311a (a component of the first frame 311).

As shown in FIGS. 13A to 13C, the operator inserts the holding member 420 into a hollow portion of the positioned portion 510, and subsequently attaches the holding member 420 to the main frame part 311a.

More specifically, as shown in FIGS. 13A and 13B, the operator passes the first positioned portion 51a of the holding member 420 through the second positioning portion 500b (hollow portion 502b).

Subsequently, as shown in FIG. 13C, the operator further moves the holding member 420 in the insertion direction K, inserts the first positioned portion 510a into the first positioning portion 500a, and inserts the second positioned portion 510b into the second positioning portion 500b.

As a result, the holding member 420 is held to be positioned to the main frame part 311a (a component of the first frame 311). More specifically, the holding member 420 is held to the main frame part 311a such that the holding member 420 is restricted from moving in a direction transverse to the main scanning direction Y.

Subsequently, as shown in FIG. 2, the operator places the two cover members 311b and 311c so as to cover the upper opening of the main frame part 311a.

In this manner, the light emitting unit 400 in the present embodiment is assembled.

Next, the operator checks whether irradiation of light from the light guiding member 340 is at a predetermined angle.

For a case where the irradiation of light from the light guiding member 340 is not at the predetermined angle (a predetermined position is not irradiated with light), the operator moves the adjustment operation portion 610 in the direction of the arrow W, and adjusts the irradiation angle of light from the light guiding member 340, as shown in FIG. 7.

More specifically, when the operator moves the adjustment operation portion 610 in the direction of the arrow W, the movement of the adjustment operation portion 610 is transferred to the holding member 420 via the transfer mechanism (not shown). Accordingly, the holding member 420 rotates around the optical axis AX. In addition, since the light guiding member 340 held to the holding member 420 rotates around the optical axis AX, the orientation of the light irradiating portion 341 is changed (adjusted) Accordingly, the irradiation angle of light from the light guiding member 340 is changed (adjusted).

According to the present embodiment, the image reading device is capable of accurately positioning the light guiding member with a simple configuration. The image reading device restricts movement in a direction, in particular, transverse to the main scanning direction Y (for example, upper, lower, left and right directions) with high accuracy.

Moreover, the image reading device does not require any other fixing members when the holding member 420 is positioned and fixed. Accordingly, it is possible that the image reading device reduces the number of parts.

In addition, since the image reading device positions and fixes the holding member without using any other fixing members, it is possible to suppress a decrease in accuracy of attachment due to accumulation of tolerances and production errors.

Although a preferred embodiment has been described above, the present disclosure can be implemented in various modes without being limited to the aforementioned embodiment.

For example, the image forming apparatus of the present disclosure is not particularly limited, and may be a copy machine, a printer, a facsimile machine, or a multi-functional printer having functions thereof.

The copying medium shaped like a sheet is not limited to paper, and may be a sheet of film, for example.

Moreover, although the first positioning portion 500a and the second positioning portion 500b have cylindrical hollow portions in the image reading device according to the present embodiment, the present disclosure is not limited thereto. For example, the image reading device may be configured such that only one of the first positioning portion 500a and the second positioning portion 500b has a cylindrical hollow portion. For example, the image reading device may be configured such that only the first positioning portion 500a has a cylindrical hollow portion.

In addition, the first positioning portion 500a and the second positioning portion 500b may not be completely cylindrical, but may have a cylindrical inner face partially opened in the image reading device. For example, the image reading device may be configured such that the first positioning portion 500a has a completely cylindrical hollow portion, and the second positioning portion 500b has a cylindrical hollow portion partially opened.

Here, "partially opened" represents that an aperture angle around the central axis CS is less than 180 degrees, preferably less than 90 degrees, or more preferably less than degrees, for example.

The invention claimed is:

1. An image reading device, comprising:
   a light emitting portion;
   a stick-like light guiding member, of which end portion is disposed to face the light emitting portion;
   a holding member configured to hold the light emitting portion and the light guiding member; and
   a case member to which the holding member is attached, wherein the holding member includes:
   a light reflecting portion;
   a first holding portion configured to hold the light emitting portion such that an optical axis thereof is aligned with a main scanning direction;
   a second holding portion configured to cause the light guiding member to be positioned with respect to the light reflecting portion, and to hold the light guiding member such that a central axis thereof is substantially coaxial with the optical axis;
   a first positioned portion that is formed at one end part of the holding member in the main scanning direction; and
   a second positioned portion that is formed at another end part of the holding member in the main scanning direction, and wherein the case member includes:
   a first positioning portion which is formed integrally with the case member and into which the first positioned portion is inserted, the first positioning portion being configured to restrict the first positioned portion thus inserted from moving in a direction transverse to the main scanning direction; and
   a second positioning portion which is formed integrally with the case member and into which the second positioned portion is inserted, the second positioning portion being configured to restrict the second positioned portion thus inserted from moving in a direction transverse to the main scanning direction.

2. The image reading device according to claim 1, wherein the first positioning portion is disposed at an inner part with respect to a direction in which the holding member is inserted into the case member.

3. The image reading device according to claim 1,
   wherein the first positioning portion includes:
   an inner face configured to be cylindrically opened or partly cylindrically opened; and
   a hollow portion formed by the inner face.

4. The image reading device according to claim 3, wherein the first positioning portion is configured to be such that a central axis of the cylindrical hollow portion is substantially coaxial with an optical axis of the light guiding member, in a state where the first positioned portion is inserted into the first positioning portion.

5. The image reading device according to claim 4, wherein an outer face of the first positioned portion is configured to be cylindrical so as to correspond to the inner face of the first positioning portion, and the first positioned portion is mated with the first positioning portion.

6. The image reading device according to claim 3,
   wherein the second positioning portion includes an inner face configured to be cylindrically opened or partly cylindrically opened and a hollow portion formed by the inner face, and
   wherein an inner diameter of the cylindrical hollow portion of the second positioning portion is larger than an inner diameter of the cylindrical hollow portion of the first positioning portion.

7. The image reading device according to claim 1, wherein the first positioning portion and the second positioning portion are configured to support the holding member rotationally around the optical axis via the first positioned portion and the second positioned portion.

8. The image reading device according to claim 7, wherein the holding member includes a restricting portion configured to restrict a rotational movement of the holding member around the optical axis.

9. The image reading device according to claim 7, further comprising an adjustment mechanism configured to cause the holding member to rotationally move such that the light guiding member rotationally moves around the optical axis.

10. An image forming apparatus comprising an image reading device,
    the image reading device comprising:
    a light emitting portion;
    a stick-like light guiding member, of which end portion is disposed to face the light emitting portion;
    a holding member configured to hold the light emitting portion and the light guiding member; and
    a case member to which the holding member is attached, wherein the holding member includes:
    a light reflecting portion;
    a first holding portion configured to hold the light emitting portion such that an optical axis thereof is aligned with a main scanning direction;
    a second holding portion configured to cause the light guiding member to be positioned with respect to the light reflecting portion, and to hold the light guiding member such that a central axis thereof is substantially coaxial with the optical axis;
    a first positioned portion that is formed at one end part of the holding member in the main scanning direction; and
    a second positioned portion that is formed at another end part of the holding member in the main scanning direction, and wherein the case member includes:
    a first positioning portion, which is formed integrally with the case member and into which the first positioned portion is inserted, the first positioning portion being configured to restrict the first positioned portion thus inserted from moving in a direction transverse to the main scanning direction; and
    a second positioning portion, which is formed integrally with the case member and into which the second positioned portion is inserted, the second positioning portion being configured to restrict the second positioned portion thus inserted from moving in a direction transverse to the main scanning direction.

11. An image reading device, comprising:
    a light emitting portion;
    a stick-like light guiding member, of which end portion is disposed to face the light emitting portion;
    a holding member configured to hold the light emitting portion and the light guiding member; and
    a case member to which the holding member is attached, wherein the holding member includes:
    a first positioned portion that is formed at one end part of the holding member in a main scanning direction; and
    a second positioned portion that is formed at another end part of the holding member in the main scanning direction, and
    wherein the case member includes:

a first positioning portion which is formed integrally with the case member and into which the first positioned portion is inserted, the first positioning portion being configured to restrict the first positioned portion thus inserted from moving in a direction transverse to the main scanning direction; and a second positioning portion which is formed integrally with the case member and into which the second positioned portion is inserted, the second positioning portion being configured to restrict the second positioned portion thus inserted from moving in a direction transverse to the main scanning direction.

\* \* \* \* \*